(12) United States Patent  
Venkatraman et al.

(10) Patent No.: US 10,959,078 B2  
(45) Date of Patent: Mar. 23, 2021

(54) SYSTEMS AND METHODS TO SUPPORT DISTRESS SIGNALING FROM A WIRELESS DEVICE

(71) Applicant: QUALCOMM Incorporated, San Diego, CA (US)

(72) Inventors: Sai Pradeep Venkatraman, Santa Clara, CA (US); Stephen William Edge, Escondido, CA (US); Subash Marri Sridhar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 15/406,526

(22) Filed: Jan. 13, 2017

(65) Prior Publication Data

US 2018/0124584 A1 May 3, 2018

Related U.S. Application Data

(60) Provisional application No. 62/415,463, filed on Oct. 31, 2016.

(51) Int. Cl.
*H04W 4/029* (2018.01)
*H04W 76/50* (2018.01)
(Continued)

(52) U.S. Cl.
CPC ........... *H04W 4/90* (2018.02); *H04M 3/5116* (2013.01); *H04W 4/023* (2013.01); *H04W 4/029* (2018.02);
(Continued)

(58) Field of Classification Search
CPC ............. H04L 65/1006; H04L 65/1016; H04L 65/1069; H04L 65/4076; H04M 3/5116;
(Continued)

(56) References Cited

U.S. PATENT DOCUMENTS

2014/0237125 A1* 8/2014 Zhou ..................... H04W 76/10  
709/227  
2015/0117309 A1* 4/2015 Gage ................. H04W 52/0241  
370/328  
(Continued)

FOREIGN PATENT DOCUMENTS

EP 1773028 A1 4/2007  
WO 2014182638 A2 11/2014

OTHER PUBLICATIONS

International Search Report and Written Opinion—PCT/US2017/052944—ISA/EPO—dated Jan. 3, 2018.

*Primary Examiner* — Erica Navar  
(74) *Attorney, Agent, or Firm* — Thien T. Nguyen

(57) ABSTRACT

Methods of assisting an emergency situation at a first User Equipment (UE) may comprise detecting the emergency situation; and sending an Emergency Services (ES) request comprising discovery information, wherein the ES request is sent by broadcast using a Long Term Evolution (LTE) Direct service, a WiFi Direct service, or a Peer-to-Peer (P2P) service. Disclosed embodiments also pertain to methods of assisting an emergency situation at a first UE, wherein the method is performed on a second UE and comprises receiving from the first UE an ES request comprising the discovery information for the first UE, wherein the ES request is received using an LTE Direct service; a WiFi Direct service or a P2P service. Disclosed embodiments further pertain to methods of communicating by first UE and/or second UE with a Public Safety Answering Point (PSAP) in order to assist discovery of the second UE by the first UE.

28 Claims, 12 Drawing Sheets

(51) Int. Cl.
*H04W 76/15* (2018.01)
*H04W 76/14* (2018.01)
*H04M 3/51* (2006.01)
*H04W 4/02* (2018.01)
*H04W 4/90* (2018.01)
*H04W 4/024* (2018.01)
*H04L 29/06* (2006.01)
*H04W 8/00* (2009.01)
*H04W 48/16* (2009.01)
*H04W 92/18* (2009.01)

(52) U.S. Cl.
CPC .......... *H04W 76/14* (2018.02); *H04W 76/15* (2018.02); *H04W 76/50* (2018.02); *H04L 65/1006* (2013.01); *H04L 65/1016* (2013.01); *H04L 65/1069* (2013.01); *H04W 4/02* (2013.01); *H04W 4/024* (2018.02); *H04W 8/005* (2013.01); *H04W 48/16* (2013.01); *H04W 92/18* (2013.01)

(58) Field of Classification Search
CPC ....... H04W 48/16; H04W 4/02; H04W 4/023; H04W 4/90; H04W 76/14; H04W 76/15; H04W 92/18
See application file for complete search history.

(56) References Cited

U.S. PATENT DOCUMENTS

2015/0358795 A1\* 12/2015 You .................. H04W 4/90
    455/404.2
2016/0066168 A1\* 3/2016 Fodor ............... H04W 4/023
    455/404.1
2016/0323248 A1\* 11/2016 Zeira ................ H04W 4/21

\* cited by examiner

SYSTEMS AND METHODS TO SUPPORT DISTRESS SIGNALING FROM A WIRELESS DEVICE

CROSS REFERENCE TO RELATED APPLICATIONS

This application claims the benefit of and priority to U.S. Provisional Patent Application No. 62/415,463 entitled "Distress Signaling" filed Oct. 31, 2016, which is assigned to the assignee hereof and incorporated by reference in its entirety herein.

FIELD

The subject matter disclosed herein relates to distress signaling and location determination and more specifically, to techniques to support mobile device positioning and emergency response when an emergency situation is detected by a mobile device.

BACKGROUND

It is often desirable to know the location of a terminal or User Equipment (UE) such as a cellular phone. For example, a location services (LCS) client may desire to know the location of a UE in the case of an emergency services (ES) call from the UE or to provide some service to the user of the UE such as navigation assistance or direction finding. The terms "location" and "position" are synonymous and are used interchangeably herein.

When a call to an ES number (e.g. 911 in North America) is placed, the ES call may be forwarded to a Public Safety Answering Point (PSAP) of a governmental agency with jurisdiction over the presumed location of the caller. Typically, under government mandates, such as Enhanced 911 or E911, carriers are required to provide a PSAP with the telephone number of the originator of a wireless 911 call and a location of the caller. However, the location provided can often be less accurate than desired. For example, position estimate may identify a particular building from where the call was made, but may not be able to identify a specific floor or unit where the UE is located. As another example, a user may move (e.g. in reaction to the emergency such as a fire) during the call or shortly after placing the call. In the above situations, emergency responders may have difficulty locating the user. As a further example, potential responders (e.g. a doctor, nurse or police officer) in a location near the caller may be unaware of the emergency services call placed in their vicinity and may not be able to provide immediate assistance.

Accurate UE location determination during and after emergency call placement, increased awareness by potential responders of emergencies in the vicinity, and/or increased situational awareness of the emergencies can facilitate response time improvement and better coordination and utilization of available emergency resources.

SUMMARY

In some embodiments, a method of assisting an emergency situation at a first User Equipment (UE) may comprise: detecting the emergency situation; and sending an Emergency Services (ES) request comprising first discovery information, wherein the ES request is sent by broadcasting the ES request using a communication service comprising: a Long Term Evolution (LTE) Direct service; or a WiFi Direct service; or a Peer-to-Peer (P2P) service. In some embodiments, the ES request may further comprise an emergency indication.

In another aspect, a first User Equipment (UE) may comprise: a memory, a transceiver, and a processor coupled to the memory and transceiver, wherein the processor is configured to: detect the emergency situation; and send, using the transceiver, an Emergency Services (ES) request comprising first discovery information, wherein the ES request is sent by broadcasting the ES request using a communication service comprising: a Long Term Evolution (LTE) Direct service; or a WiFi Direct service; or a Peer-to-Peer (P2P) service. In some embodiments, the ES request may further comprise an emergency indication.

In a further aspect, a first User Equipment (UE) may comprise: means for detecting an emergency situation; and means for sending an Emergency Services (ES) request comprising first discovery information, wherein the ES request is sent by broadcasting the ES request using a communication service comprising: a Long Term Evolution (LTE) Direct service; or a WiFi Direct service; or a Peer-to-Peer (P2P) service. In some embodiments, the ES request may further comprise an emergency indication.

Disclosed embodiments also pertain to a non-transitory computer-readable medium comprising executable instructions to configure a processor on a first User Equipment (UE) to: detect the emergency situation; and send an Emergency Services (ES) request comprising first discovery information, wherein the ES request is sent by broadcasting the ES request using a communication service comprising: a Long Term Evolution (LTE) Direct service; or a WiFi Direct service; or a Peer-to-Peer (P2P) service. In some embodiments, the ES request may further comprise an emergency indication.

In some embodiments, a method of assisting an emergency situation at a first User Equipment (UE) comprising: initiating an emergency call using a network communication protocol; and transmitting an Emergency Services (ES) request comprising first discovery information using a communication service based on a device-to-device protocol, wherein the communication service is selected from a group consisting of: a Long Term Evolution (LTE) Direct service, a WiFi Direct service, and a Peer-to-Peer (P2P) service.

In another aspect, a first UE may comprise: a memory, a transceiver, and a processor coupled to the memory and the transceiver. The processor may be configured to: initiate, using the transceiver, an emergency call using a network communication protocol, and transmit, using the transceiver, an Emergency Services (ES) request comprising first discovery information using a communication service based on a device-to-device protocol, wherein the communication service is selected from a group consisting of: a Long Term Evolution (LTE) Direct service, a WiFi Direct service, and a Peer-to-Peer (P2P) service.

In a further aspect, a first UE may comprise: means for initiating an emergency call using a network communication protocol; and means for transmitting an Emergency Services (ES) request comprising first discovery information using a communication service based on a device-to-device protocol, wherein the communication service is selected from a group consisting of: a Long Term Evolution (LTE) Direct service, a WiFi Direct service, and a Peer-to-Peer (P2P) service.

Disclosed embodiments also pertain to a non-transitory computer-readable medium comprising executable instructions to configure a processor to: initiate an emergency call using a network communication protocol; and transmit an Emergency Services (ES) request comprising first discovery information using a communication service based on a device-to-device protocol, wherein the communication service is selected from a group consisting of: a Long Term Evolution (LTE) Direct service, a WiFi Direct service, and a Peer-to-Peer (P2P) service.

Some disclosed embodiments pertain to a method on a first User Equipment (UE), the first UE associated with first discovery information, to assist an emergency situation at a second UE, the method comprising: receiving, from the second UE, an Emergency Services (ES) request comprising second discovery information for the second UE, wherein the ES request is received using a communication service comprising: a Long Term Evolution (LTE) Direct service; or a WiFi Direct service; or a Peer-to-Peer (P2P) service; and transmitting a response to the ES request, the response comprising first discovery information for the first UE. In some embodiments, the ES request may further comprise an emergency indication.

In some embodiments, the response to the ES request is transmitted using the communication service, and the method may further comprise: establishing, based on at least one of the first discovery information and the second discovery information, a first secure communication session between the first UE and the second UE using the communication service. In some embodiments, the first secure communication session may support multimedia communications. In some embodiments, the first secure communication session may comprise a voice session. In some embodiments, at least one of: the received ES request, or the response to the ES request is encrypted. In some embodiments, receiving the ES request, sending the response to the ES request, and establishing the first secure communication session may occur through an application supporting emergency services communication on the second UE.

In some embodiments, the method may further comprise: determining, based on the first secure communication session, a location of the second UE. Further, determining the location of the second UE may comprise: determining a range between the first UE and the second UE, determining an angle or arrival of a signal from the second UE to the first UE, or determining both of the above measurements.

In some embodiments, upon establishment of the first secure communication session, the method may further comprise: sending a first message to a Public Safety Answering Point (PSAP) requesting establishment of a second secure communication session with the PSAP; and receiving from the PSAP, a second message comprising a token, wherein the second discovery information comprises at least part of the token. In some embodiments, the method may further comprise: establishing the second secure communication session with the PSAP. The first message and the second message may be messages for the Session Initiation Protocol (SIP). For example, the first message may be a SIP INVITE message and the second message may be a SIP INFO, SIP UPDATE or SIP 200 OK message.

In one aspect, a first User Equipment (UE) may comprise: a memory to store first discovery information associated with the first UE, a transceiver, and a processor coupled to the memory and transceiver, wherein the processor is configured to: receive, using the transceiver, from a second UE, an Emergency Services (ES) request comprising second discovery information for the first UE, wherein the ES request is received using a communication service comprising: a Long Term Evolution (LTE) Direct service; or a WiFi Direct service; or a Peer-to-Peer (P2P) service; and transmit, using the transceiver, a response to the ES request, the response comprising first discovery information for the first UE. In some embodiments, the ES request may further comprise an emergency indication. In some embodiments, the processor may be further configured to perform one or more of the functions described above.

In a further aspect, a first User Equipment (UE) may comprise: storage means to store a first discovery associated with the first UE; means for receiving, from a second UE, an Emergency Services (ES) request comprising first discovery information for the second UE, wherein the ES request is received using a communication service comprising: a Long Term Evolution (LTE) Direct service; or a WiFi Direct service; or a Peer-to-Peer (P2P) service; and transmitting a response to the ES request, the response comprising first discovery information for the first UE. In some embodiments, the ES request may further comprise an emergency indication. The first UE may further comprise means to perform one or more of the functions recited above.

Disclosed embodiments also pertain to a non-transitory computer-readable medium comprising executable instructions to configure a processor on a first User Equipment (UE) associated with first discovery information to: receive, from a second UE, an Emergency Services (ES) request comprising second discovery information for the first UE, wherein the ES request is received using a communication service comprising: a Long Term Evolution (LTE) Direct service; or a WiFi Direct service; or a Peer-to-Peer (P2P) service; and transmit a response to the ES request, the response comprising first discovery information for the first UE. In some embodiments, the ES request may further comprise an emergency indication. In some embodiments, the executable instructions may further configure the processor to perform one or more of the functions described above.

Disclosed embodiments pertain to a method to facilitate LTE direct Emergency Services (ES) communication. In some embodiments, the method may comprise: receiving, from a UE, a request for authorization to broadcast ES requests using an LTE Direct service; and transmitting an authorization to the UE to broadcast ES Requests using the LTE Direct service. The method may be performed on a server such as Proximity-based Services (ProSe) Function 270 and the request for authorization may comprise a ProSe Discovery Request. The request for authorization received from the UE may comprise one or more of: a ProSe Application ID, a Restricted ProSe Application User ID, a UE Identity, an announce command, an Application ID, a Discovery Type, a Discovery Entry ID, and/or a token. The authorization may include one or more parameters including: a ProSe Application Code, a ProSe Restricted Code, a validity timer, a Discovery Entry ID. The ProSe Application Code in the authorization may correspond to a ProSe Application ID that was included in the request for authorization. In some embodiments, the authorization may include configuration parameters for an LTE Direct broadcast by the requesting UE. In some embodiments, the configuration parameters may comprise frequencies and/or channels to use for the broadcast, a power level for the broadcast and/or an interval of time for the broadcast.

In another aspect, a server may comprise: a memory, a communications interface, the communications interface communicatively coupled to a network; and a processor coupled to the memory and the communications interface. The processor may be configured to: receive, through the communications interface, a request, from a UE, for authorization to broadcast ES requests using an LTE Direct service; and transmit through the communications interface, an authorization to the UE to broadcast Emergency Services (ES) Requests using the LTE Direct service. The request for authorization received from the UE may comprise one or more of: a ProSe Application ID, a Restricted ProSe Application User ID, a UE Identity, an announce command, an Application ID, a Discovery Type, a Discovery Entry ID, and/or a token. The authorization may include one or more parameters including: a ProSe Application Code, a ProSe Restricted Code, a validity timer, a Discovery Entry ID. The ProSe Application Code in the authorization may correspond to a ProSe Application ID that was included in the request for authorization.

In a further aspect, a server may comprise: means for receiving, from a UE, a request for authorization to broadcast Emergency Services (ES) requests using an LTE Direct service; and means for transmitting an authorization to the UE to broadcast ES Requests using the LTE Direct service. The request for authorization received from the UE may comprise one or more of: a ProSe Application ID, a Restricted ProSe Application User ID, a UE Identity, an announce command, an Application ID, a Discovery Type, a Discovery Entry ID, and/or a token. The authorization may include one or more parameters including: a ProSe Application Code, a ProSe Restricted Code, a validity timer, a Discovery Entry ID. The ProSe Application Code may correspond to a ProSe Application ID that was included in the request for authorization.

Disclosed embodiments also pertain to a non-transitory computer-readable medium comprising executable instructions to configure a processor to: receive, from a UE, a request for authorization to broadcast ES requests using an LTE Direct service; and transmit an authorization to the UE to broadcast ES Requests using the LTE Direct service. The request for authorization received from the UE may comprise one or more of: a ProSe Application ID, a Restricted ProSe Application User ID, a UE Identity, an announce command, an Application ID, a Discovery Type, a Discovery Entry ID, and/or a token. The authorization may include one or more parameters including: a ProSe Application Code, a ProSe Restricted Code, a validity timer, a Discovery Entry ID. The ProSe Application Code may correspond to a ProSe Application ID that was included in the request for authorization.

Some disclosed embodiments also pertain to a method to facilitate LTE direct Emergency Services (ES) communication. The method may comprise receiving, from a UE, a request for an authorization to monitor Emergency Services (ES) requests broadcast using a Long Term Evolution (LTE) Direct service; and transmitting an authorization to the UE to monitor the broadcast ES Requests using the LTE Direct service The authorization request may comprise one or more of: a ProSe Application ID, one or more Restricted ProSe Application User IDs, a monitor command, a Discovery Type, an Application ID, a Discovery Entry ID, and/or a token. The authorization may comprise one or more of: Discovery Filter(s) and/or a Discovery Entry ID, wherein a Discovery Filter comprises one or more of: a ProSe Application Code, a ProSe Restricted Code, ProSe Application Mask(s) and/or a Time To Live value. The ProSe Application Code may correspond to a ProSe Application ID that was included in the authorization request. In some embodiments, the method may be performed on a server. In some embodiments, the server may comprise: one or more of: ProSe Function 270, and/or a ProSe AS 272, and/or an Expression Name Server (ENS) communicatively coupled to a UE.

In another aspect, a server may comprise: a memory, a communications interface communicatively coupled to a network, and a processor coupled to the memory and the communications interface. The processor may be configured to: receive, through the communications interface, a request, from a UE, for authorization to broadcast ES requests using an LTE Direct service; and transmit through the communications interface, an authorization to the UE to broadcast Emergency Services (ES) Requests using the LTE Direct service. The authorization request may comprise one or more of: a ProSe Application ID, one or more Restricted ProSe Application User IDs, a monitor command, a Discovery Type, an Application ID, a Discovery Entry ID, and/or a token. The authorization may comprise one or more of: Discovery Filter(s) and/or a Discovery Entry ID, wherein a Discovery Filter comprises one or more of: a ProSe Application Code, a ProSe Restricted Code, ProSe Application Mask(s) and/or a Time To Live value. The ProSe Application Code may correspond to a ProSe Application ID that was included in the authorization request. In some embodiments, the server may comprise: one or more of: ProSe Function 270, and/or a ProSe AS 272, and/or an Expression Name Server (ENS) communicatively coupled to a UE.

In a further aspect, a server may comprise: means for receiving, from a UE, a request for authorization to broadcast Emergency Services (ES) requests using an LTE Direct service; and means for transmitting an authorization to the UE to broadcast ES Requests using the LTE Direct service. The authorization request may comprise one or more of: a ProSe Application ID, one or more Restricted ProSe Application User IDs, a monitor command, a Discovery Type, an Application ID, a Discovery Entry ID, and/or a token. The authorization may comprise one or more of: Discovery Filter(s) and/or a Discovery Entry ID, wherein a Discovery Filter comprises one or more of: a ProSe Application Code, a ProSe Restricted Code, ProSe Application Mask(s) and/or a Time To Live value. The ProSe Application Code may correspond to a ProSe Application ID that was included in the authorization request. In some embodiments, the server may comprise: one or more of: ProSe Function 270, and/or a ProSe AS 272, and/or an Expression Name Server (ENS) communicatively coupled to a UE.

Disclosed embodiments also pertain to a non-transitory computer-readable medium comprising executable instructions to configure a processor on a server to: receive, from a UE, a request for authorization to broadcast ES requests using an LTE Direct service; and transmit an authorization to the UE to broadcast ES Requests using the LTE Direct service. The authorization request may comprise one or more of: a ProSe Application ID, one or more Restricted ProSe Application User IDs, a monitor command, a Discovery Type, an Application ID, a Discovery Entry ID, and/or a token. The authorization may comprise one or more of: Discovery Filter(s) and/or a Discovery Entry ID, wherein a Discovery Filter comprises one or more of: a ProSe Application Code, a ProSe Restricted Code, ProSe Application Mask(s) and/or a Time To Live value. The ProSe Application Code may correspond to a ProSe Application ID that was included in the authorization request. In some embodiments, the server may comprise: one or more of: ProSe Function 270, and/or a ProSe AS 272, and/or an Expression Name Server (ENS) communicatively coupled to a UE.

The methods disclosed may be performed (as appropriate) by one or more of: UEs, servers, and/or other entities described herein. Embodiments disclosed also relate to software, firmware, and program instructions created, stored, accessed, read or modified by processors using non-transitory computer readable media or computer readable memory.

Figure 1:
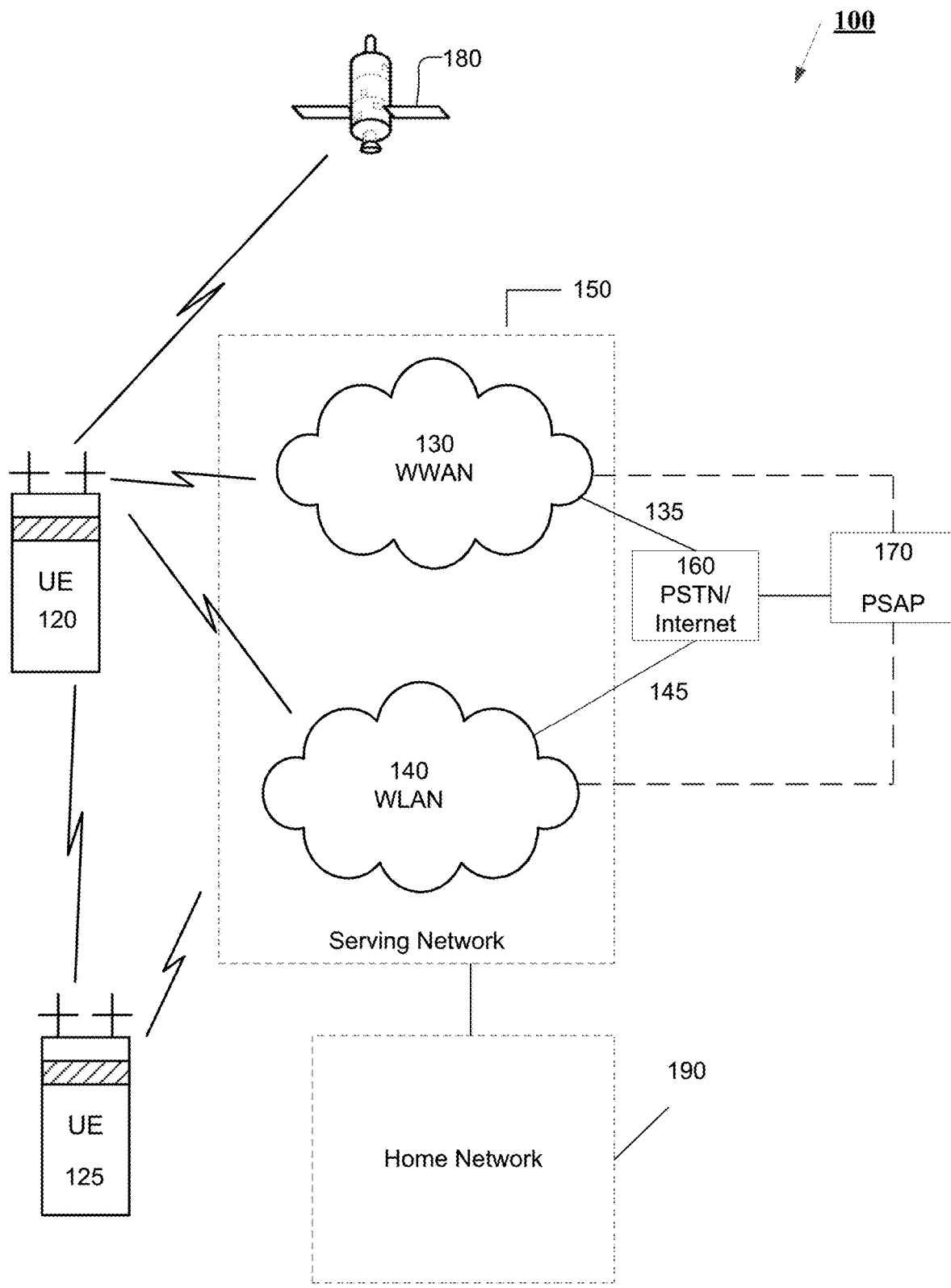
FIG. 1 shows an architecture of an exemplary system that may be involved in the provision of emergency services to the user of a wireless device.

Like numbered entities in different figures may correspond to one another. Reference to a numbered entity in any figure may therefore correspond to any like numbered entity in any other figure.

DETAILED DESCRIPTION

In the figures described below, one or more of the blocks shown may correspond to logical entities. The logical entities and blocks shown in the figures are merely exemplary and the functions associated with the logical entities/blocks may be split or combined in various ways in a manner consistent with disclosed embodiments. For example, the logical entities shown may be implemented on physically separate devices, or, one or more of the logical entities may be included in a single physical server or device.

A "wireless device" may be referred to as a "mobile station" (MS), "user equipment" (UE), "target", "mobile terminal", "wireless terminal", "terminal", "mobile device" and by other names A wireless device (or UE) may be a cellular or other wireless communication device, a personal communication system (PCS) device, a personal navigation device (PND), a Personal Information Manager (PIM), a Personal Digital Assistant (PDA), a laptop, cell phone, smartphone, tablet, tracking device or other suitable mobile device which is capable of sending and/or receiving wireless communication and/or navigation signals. The terms are also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

A position estimate may be referred to as a location estimate, a position fix, a location, a position, a fix or by some other name A location estimate may be geodetic and comprise coordinates (e.g. latitude, longitude and possibly altitude) or may be civic and comprise a street address, postal address or some other verbal description of a location. A location estimate may further be defined relative to some other known location or defined in absolute terms (e.g. using latitude, longitude and possibly altitude). A location estimate may also include an expected error (e.g. by including an area or volume within which the location is expected to be included with some specified or default level of confidence).

The techniques described herein are associated with supporting emergency situations experienced by the user of a wireless device. Emergency situations can include any of a large variety of situations that may pose a danger to the user or to other users or property nearby to (or possibly remote from) the user. Examples can include medical situations (e.g. heart attack, stroke, injury due to a fall, drowning, asthma attack), traffic accidents, natural events (e.g. tornado, hurricane, earthquake, flood), building incidents (e.g. fire, structural failure), criminal activity (e.g. robbery, assault). Emergency situations may be detected by a user who then indicates an emergency situation to a wireless device (e.g. by dialing the digits "911" in the US or "112" in Europe), or may be detected by a wireless device (e.g. if equipped with sensors or having access to remote sensors such as medical sensors attached to a user). In response to the indication of an emergency situation by a user or automatically detecting an emergency situation using sensors, a wireless device may attempt to instigate an emergency call to a PSAP and/or may wirelessly transmit an emergency related signal, also referred to as a distress signal, which may be received by nearby wireless devices belonging to other users. In the case of an emergency call to a PSAP, the PSAP may obtain information concerning the emergency situation from the user (if that is possible), or from the wireless device (e.g. from sensors coupled to the wireless device), and may obtain the location of the wireless device (e.g. from the wireless device or from a wireless network serving the wireless device) and may then dispatch suitable public safety assistance to the location of the user. In the case of transmitting a distress signal, another user who has a wireless device that is able to receive the distress signal may similarly obtain information concerning the emergency situation if that is possible and may obtain the location of the wireless device that is transmitting the distress signal (e.g. from this wireless device) and may then proceed to the location of the user who is experiencing the emergency situation to provide emergency related assistance.

FIG. 1 shows an architecture of an exemplary system 100 with a PSAP 170 and other entities including a UE 125 that may be involved in the provision of Emergency Services (ES) to a UE 120. In FIG. 1, UE 120 may represent a device associated with a user requiring emergency services and whose location may need to be determined. UE 125 may represent a device associated with a responder that may be involved in the provision of emergency services to the user of UE 120. Although a single UE 125 is shown in FIG. 1, system 100 may include several additional UEs, which may be in communication with UE 120 and/or network 150.

The term "emergency responder," or "responder" as used herein may also apply to personnel in the vicinity of the emergency response event who may be authorized and/or available to respond. For example, UEs 125 associated with doctors, medical professionals, security personnel, etc. may be configured to monitor emergency service transmissions from other UEs such as UE 120 in accordance with embodiments disclosed herein. As one example, responder UEs 125 may be subscribed to, enrolled in, and/or may be allowed access to one or more types of emergency related broadcasts (e.g. Long Term Evolution (LTE) Direct and/or WiFi Direct broadcasts based on IEEE 802.11 standards) from other UEs, such as UE 120. As one example, UEs 125 may have applications that may monitor emergency related broadcasts by another UE, such as UE 120, and/or be activated upon detection of an appropriate emergency related broadcast by a UE 120. The applications may provide an alert to the responder (e.g. visual, audible, and/or tactile) and, when authorized, may initiate communication with UE 120 in a manner consistent with disclosed embodiments. The term "initiate communication" refers to actions at an entity (e.g. UE 125 or another device) to establish communication with another entity (e.g. UE 120 or a PSAP). If the initiation of communication is successful, then communication (e.g. a communication session) with the other entity may be established. If the initiation fails, communication with the other entity may not be established.

UE 120 may be stationary or mobile and may also be referred to as a mobile station, a terminal, a subscriber unit, a station, etc. UE 120 may be a cellular phone, a handheld device, a wearable device, a personal digital assistant (PDA), a wireless device, a wireless modem, a laptop computer, a telemetry device, a tracking device, etc. UE 120 may be identified in various ways, including by one or more of: a phone number associated with UE 120 (e.g. a Mobile Station International Subscriber Directory Number (MSISDN)), an International Mobile Equipment Identity (IMEI) number, a Medium Access Control (MAC) address, an International Mobile Subscriber Identity (IMSI), and/or another device identifier and/or some combination of these.

Network 150 may comprise one or more Wireless Wide Area Networks (WWAN) 130 and/or Wireless Local Area Networks (WLAN) 140. Network 150 may provide radio communication for UE 120 and/or UE 125. Network 150 may also be referred to as a radio network, a radio access network, a wireless network, a cellular network etc. Network 150 may include base stations, access points, network controllers, and/or other entities that provide data and/or voice connectivity, location services, and/or other functionalities and services. In addition, network 150 may be coupled to a Public Switched Telephone Network (PSTN) and/or the Internet 160, and/or other voice and data networks. A PSTN supports communication for conventional plain old telephone service (POTS).

Network 150 may be a serving network for UE 120 and/or UE 125 and may then be referred to herein as a serving network 150. UE 120 may have a home network 190 which, in some cases (e.g. when UE 120 is roaming), may be different to serving network 150. In other cases (e.g. when UE 120 is not roaming), serving network 150 and home network 190 may be the same network. Similarly, UE 125 may have a home network which may be serving network 150, home network 190 or some other network (not shown in FIG. 1). Other networks may be present (not shown in FIG. 1) that are connected to serving network 150 or reachable from serving network 150 such as other wireless networks local to UE 120 and UE 125.

WWAN 130 may include e.g., cellular networks, and may be referred to herein sometimes as a cellular network. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OI-DMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards defined by the Telecommunications Industry Association (TIA). A TDMA network may implement Global System for Mobile Communications ("GSM"), Digital Advanced Mobile Phone System ("D-AMPS"), or some other RAT. An OFDMA network may implement Long Term Evolution (LTE), LTE Advanced (LTE-A) or so called Fifth Generation (5G). GSM, W-CDMA, LTE, LTE-A and one early version of 5G are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. The transmitters for the WWAN 130 may be sometimes referred to herein, as e.g., base stations, evolved Node Bs (eNodeBs) or cellular towers, but are not limited thereto.

In some embodiments, network 150 may form part of, comprise or contain an Evolved Packet System (EPS), which may comprise an evolved UMTS Terrestrial Radio Access Network (E-UTRAN) and an Evolved Packet Core (EPC).

UE 120 and UE 125 may communicate with one or more base stations and/or one or more access points in serving network 150. In some embodiments, the communication may occur using network communication protocol(s). UE 120 (or UE 125) may measure signals from base stations in serving network 150 and obtain timing measurements for the base stations, which may used to determine its location. For example, UE 120 (or UE 125) may measure Reference Signals, such as Positioning Reference Signals (PRS) or Cell Specific Reference Signals (CRS), transmitted by base stations to determine its location (e.g. using multilateration). For example, PRS measurements may be used to obtain Reference Signal Time Difference (RSTD) measurements for Observed Time Difference of Arrival (OTDOA), which may be used to determine a location of UE 120 (and/or of UE 125). In OTDOA based positioning, a UE may measure time differences for received PRS and/or received CRS. The measured time difference of arrival of the PRS from a reference cell and one or more neighboring cells may be used to obtain RSTDs. The RSTDs may be used in conjunction with the positions of base stations (which can be known or obtained) to calculate the position of the UE. The calculation may be performed by the UE (e.g. if base station antenna locations are provided to the UE by a network) or by a location server in a network (e.g. serving network 150 in the case of positioning UE 120 or 125) if the RSTD measurements are provided by the UE to the location server. In general, a UE may use a variety of radio-location techniques based on wireless signal measurements such as Received Signal Strength Indication (RSSI), Round Trip Time (RTT), Time Of Arrival (TOA), individually, or in combination to determine its location.

As part of positioning of a UE in the case that a location server in a network (e.g. serving network 150) is used to position or help position the UE, a positioning protocol may be used to exchange positioning related information such as location measurements (e.g. RSTD measurements) and assistance data (e.g. base station antenna locations) between the UE and location server. In the case of a UE with LTE, LTE-A or possibly 5G wireless access, a positioning protocol known as LTE Positioning Protocol (LPP) may be used. LPP is described in various publicly available technical specifications from 3GPP (e.g. 3GPP Technical Specification (TS) 36.355). Another positioning protocol known as LPP Extensions (LPPe) may also be used. LPPe has been defined by the Open Mobile Alliance (OMA) (e.g. in OMA TS OMA-TS-LPPe-V1_0) and may be used in combination with LPP such that an LPP message may contain an embedded LPPe message in a combined LPP/LPPe message. In general, a positioning protocol such as LPP and LPPe may be used to coordinate and control position determination. The positioning protocol may define: (a) positioning related procedures that may be executed by a location server (LS) and/or a UE; and/or (b) communication or signaling related to positioning between the LS and UE.

In some embodiments, WLAN 140 may be based on the Institute of Electrical and Electronic Engineers (IEEE) 802.11x standard (including, for example, standards related to IEEE 802.11ac, "Wireless LAN Medium Access Control (MAC) and Physical Layer (PHY) Specifications," 2013) and variants thereof. In WLAN 140, positioning may be performed using multilateration based on Round Trip Time (RTT) measurements, RSSI measurements, Angle of Arrival (AoA) measurements, and/or Angle of Departure (AoD) measurements between a UE and one or more Access Points (APs).

In some embodiments, devices such as UE 120 and UE 125 may communicate directly (using "device to device" communication) without an intervening AP or other network resource, using a service such as WiFi Direct and/or LTE Direct and/or a P2P service. "WiFi Direct" refers to a set of standards (published by organization called the WiFi Alliance), which facilitate discovery of and secure communication between nearby devices (e.g. UEs 120 and 125) over the unlicensed 802.11x spectrum. The term "discovery" as used herein refers to detection of devices and/or detection of services (e.g. services provided by a communication network). The term "discovery information" is used to refer to information (such as identifying information) that may facilitate discovery of and/or communication with discovered devices or services. The term "P2P service" refers to services that facilitate direct device to device communication (e.g. via ad-hoc mode or Independent Basic Service Set (IBSS) in IEEE 802.11). In some instances, when using P2P, peer device discovery may be facilitated by information provided by the PSAP and/or another entity.

In WiFi Direct, for example, UEs 120 and 125 may exchange discovery information including information about supported services prior to establishing a secure communication session. For example, UE 120 may be capable of broadcasting discovery information using WiFi Direct. In some embodiments, the discovery information broadcast using WiFi Direct may include an emergency services request (ESR) information element (IE). In some embodiments, the ESR IE may be a sub-field of, or a particular value for, an existing IE (e.g. part of an IEEE 802.11 frame body and/or a vendor specific IE) of an 802.11x MAC header frame. The ESR IE may indicate a general emergency or general distress situation, a particular type of emergency or distress situation, or a request for a general or particular type of emergency assistance. In some embodiments, responder UE 125 may monitor (or "listen for") WiFi Direct transmissions for the presence of an ESR (or ESR IE). When an ESR (or ESR IE) is detected by UE 125 in a WiFi Direct transmission (e.g. from UE 120), UE 125 may respond with an indication of ES support and additional discovery related information (e.g. for communication with UE 125). This and possibly subsequent WiFi Direct communication between UE 120 and UE 125 may enable a secure WiFi Direct communication session to be established between UE 120 and UE 125 in which communication between UEs 120 and 125 may be encrypted to avoid interception by other UEs. UEs 120 and 125 may then use this secure WiFi Direct communication session to exchange additional emergency related information. While additional emergency related information may be communicated by UE 120 after establishment of the secure communication session (e.g. as outlined above), the additional emergency related information may, in some embodiments, optionally be included as part of the broadcast discovery request by UE 120. The additional emergency related information may include one or more of: an application ID, an identifier for the emergency, a location (e.g. of UE 120), information about the nature of the emergency (e.g. medical, fire etc.), information about the user of UE 120 (e.g. any known medical condition, contact information for a doctor, hospital, family member), etc.

LTE Direct is a set of standards defined by 3GPP that facilitates device-to-device discovery and secure communications between proximate devices utilizing licensed or unlicensed LTE spectrum. LTE Direct may also be referred to as Proximity-based Services (ProSe) and LTE Direct signaling may be referred to as "sidelink" signaling. In LTE Direct for example, a device such as UE 120 may broadcast a message or beacon which may include information that identifies and/or requests a service. The information that identifies and/or requests the service may be referred to as an "expression", a "ProSe application code", a "ProSe restricted code" or by some other name The term "expression" is generally used herein but may correspond to or include either a "ProSe application code" or a "ProSe restricted code" as defined by 3GPP in 3GPP Technical Specification (TS) 23. 303, entitled "Proximity-based services (ProSe); Stage 2" in some embodiments.

In some embodiments, employing LTE Direct, UE 120 may broadcast an expression indicating an "emergency services request" (ESR). The ESR expression may include one or more of: a name (e.g. of the expression); a code, which may comprise discovery information (e.g. to communicate with UE 120); an indication of an emergency related situation (which may indicate a specific type of emergency situation) and other metadata or information elements. These information elements may include: an emergency indication, an application, a location (e.g. of UE 120), information about the nature of the emergency (e.g. medical, fire etc.). The ESR expression may be a "public expression," which is capable of being recognized by a wide array of LTE Direct devices, or a "private expression," which may be recognized only by appropriately configured devices (e.g. by appropriately configured responder UEs 125). A public expression may correspond to or include a 3GPP ProSe application code whereas a private expression may correspond to or include a 3GPP ProSe restricted code. In some embodiments, UE 125, which may monitor (e.g. listen for) broadcasts for emergency service related expressions, may detect the ESR expression and respond to UE 120. In some embodiments, UE 125 may communicate with an Expression Name Server (ENS) to obtain additional information about the expression broadcast by UE 120. In some embodiments, an ESN may correspond to a "ProSe Function" as described later.

The term ESR is used broadly herein to mean a general indication of an emergency. The ESR may include information pertaining to the emergency type (medical, fire, security etc.) and/or separate ESRs may be created for different emergency types (e.g. a Medical ESR, Fire ESR, Security ESR etc.). A particular emergency assistance scenario may have more than one emergency type; for example, an emergency may be both a fire emergency and a medical emergency, so multiple ESRs can be generated (e.g. and may be broadcast by a UE 120 and received by one or more other UEs 125) for a particular emergency assistance scenario.

In some embodiments, a UE 120 may be configured to automatically initiate LTE Direct ESR expression broadcasts and/or WiFi Direct broadcasts with an ESR indication and/or another P2P ESR broadcast upon detection of an emergency (e.g. when a user dials "911" or "112" or when a sensor attached to or accessible from the UE 120 detects an emergency situation). For example, when a smoke detector or carbon monoxide detector is triggered, one or more of an LTE Direct, WiFi Direct and/or P2P ESR broadcast may be automatically initiated by a UE 120 that has communication access to the detector. As another example, a medical device (e.g. an implanted, wearable, or user-coupled device monitoring a medical condition) may initiate an ESR broadcast (either directly or through an application on a communicatively coupled UE 120) when a medical emergency is detected. As another example, a UE 120 that is part of a vehicular communication system may initiate an ESR broadcast upon detection of a vehicle related emergency. As a further example, a user may trigger the LTE Direct, WiFi Direct and/or P2P ESR transmission by placing an ES call, or by invoking an ES related application on UE 120. The examples above are merely illustrative and various other situations to manually or automatically initiate ESR broadcasts are envisaged. In general, when sensors are used to detect an emergency situation, an ESR broadcast may be initiated (e.g. using LTE Direct, WiFi Direct and/or P2P) automatically upon detection of the emergency situation. In some embodiments, an emergency call (e.g. to a PSAP 244/248) using any available network communication protocol may be initiated (e.g. by a UE 120) in response to user input, sensor information, or a combination thereof. In some embodiments, the ES request may further comprise an emergency indication (e.g. information of the nature of the emergency fire, medical, vehicular, etc and/or other emergency related information).

In some other embodiments, a UE 120 may be configured to initiate LTE Direct ESR expression broadcasts and/or WiFi Direct broadcasts with an ESR indication and/or another P2P ESR broadcast only after receiving an instruction from a user or from a remote entity in communication with UE 120 such as PSAP 170. In some of these embodiments, it may also be necessary that UE 120 is also aware of an emergency situation—e.g. due to a user previously dialing "911" or "112" on UE 120 or due to UE 120 detecting the emergency situation automatically using an attached or communicatively coupled sensor. The instruction to initiate LTE Direct ESR expression broadcasts and/or WiFi Direct broadcasts with an ESR indication and/or another P2P ESR broadcast may be made manually by the user (e.g. via certain key strokes) or may be received from a remote entity (e.g. PSAP 170) as part of an emergency related session or call between UE 120 and the remote entity. These embodiments may be useful to avoid sending emergency related ESR broadcast information by UE 120 for less serious emergency situations or where a PSAP 170 is able to dispatch emergency assistance to the location of UE 120 rapidly.

In some embodiments, LTE Direct, WiFi Direct, or P2P communication between UE 120 and UE 125 may also be leveraged to perform Round Trip Time (RTT), RSSI, Angle of Arrival (AoA), and/or Angle of Departure (AoD) measurements between UE 120 and UE 125. These measurements may be used, at least in part, by UE 125 and/or by UE 120 to determine a location of UE 120 and/or of UE 125. The location (or locations) may be used by the user of UE 125 to come to the assistance of the user of UE 120. In some instances, the location may be used in the opposite sense to enable the user of UE 120 to find the user of UE 125—e.g. in the case that the user of UE 120 is trying to escape from a dangerous environment (e.g. a burning building or burning aircraft) and the user of UE 125 is located in a safer environment (e.g. at an exit to a building). The location (or locations) may be absolute or relative. The term "Angle of Arrival" (AoA) here refers to a direction of propagation of a radio-frequency wave incident on two or more antennas or an antenna array relative to the orientation of the antennas or antenna array. As one example, AoA may be determined based on the Time Difference of Arrival (TDOA) or phase difference measurements of a radio wave received at individual elements of an antenna array. The term "Angle of Departure" (AoD) refers to a direction of propagation of a radio-frequency wave transmitted from two or more antennas or an antenna array relative to an orientation of the antennas or antenna array. For example, AoA and AoD may be determined based on LTE Direct or WiFi Direct signals exchanged between UE 125 and UE 120. For example, UE 125 may resolve AoA and AoD based on signals exchanged with UE 120. AoA, AoD, and RTT signal measurements may be used to determine an absolute location of UE 120 and/or UE 125 and/or to determine a location of UE 120 and/or UE 125 relative to a current location of UE 125 and/or UE 120, respectively.

In some embodiments, UE 120 and UE 125 may receive signals from a Satellite Positioning System (SPS), which may include a plurality of satellites 180 (also referred to as space vehicles (SVs)). Satellites 180 may be part of a Global Navigation Satellite System (GNSS). GNSS includes systems such as the US Global Positioning System (GPS), the European Galileo system, the Russian Glonass system or the Chinese Beidou system. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. A UE 120 and/or UE 125 may also measure signals from satellites 180 and obtain pseudo-range measurements for the satellites. The pseudo-range measurements and/or timing measurements may be used to derive a position estimate for UE 120 and/or UE 125. In some embodiments, UE 120 may provide location information (e.g. obtained using an SPS or by other methods) to UE 125 as part of an ESR or during a communication session following the ESR request. Similarly, UE 125 may provide location information (e.g. obtained using an SPS or by other methods) to UE 120 during a communication session following an ESR request.

As outlined above, in FIG. 1, UE 120 may represent a device associated with a user requiring emergency services and whose location may need to be determined. For example, a user may have placed an emergency services call (e.g. E911) using UE 120 and the location of UE 120 may be determined and used to dispatch emergency responders. The emergency services call may be routed over serving network 150 to Public Safety Answering Point (PSAP) 170. PSAP 170 may be an entity responsible for answering emergency calls, e.g., for police, fire, and medical services. An emergency services call may be routed over one or more of serving network 150 and/or PSTN/Internet 160. As outlined above, in enhanced emergency services (such as E911 mandated by the FCC) the location of UE 120, or information that can be used to determine a location of UE 120, is sent to PSAP 170 in conjunction with an emergency services call placed using UE 120. PSAP 170 may then respond to the distress call by dispatching emergency responders to the estimated location of UE 120.

Once emergency responders are in the general vicinity of UE 120, a search may traditionally be needed to locate the user of UE 120—e.g. if an initial location of UE 120 provided to PSAP 170 is not very accurate. In some embodiments, an emergency responder equipped with a UE 125 may be able to receive an LTE Direct ESR message or signal, WiFi Direct ESR indication and/or another P2P ESR broadcast by UE 120, which may enable a secure communication session to be established between UE 120 and UE 125 as described previously. The emergency service responder may then be able to obtain a more accurate location of UE 120 if UE 120 and UE 125 perform positioning of one or both UEs using measurements of RTT, AOA, AOD and/or RSSI as described previously. In these embodiments, PSAP 170 may trigger the broadcast by UE 120 of an LTE Direct ESR message or signal, WiFi Direct ESR indication and/or another P2P ESR—e.g. based on UE 120 still having an emergency session with PSAP 170 and an emergency responder indicating to PSAP 170 (e.g. via UE 125) of being in the vicinity of UE 120. Embodiments such as these may significantly reduce the time needed for emergency responders to locate the user of UE 120 following an ES call from UE 120 to PSAP 170.

Figure 2:
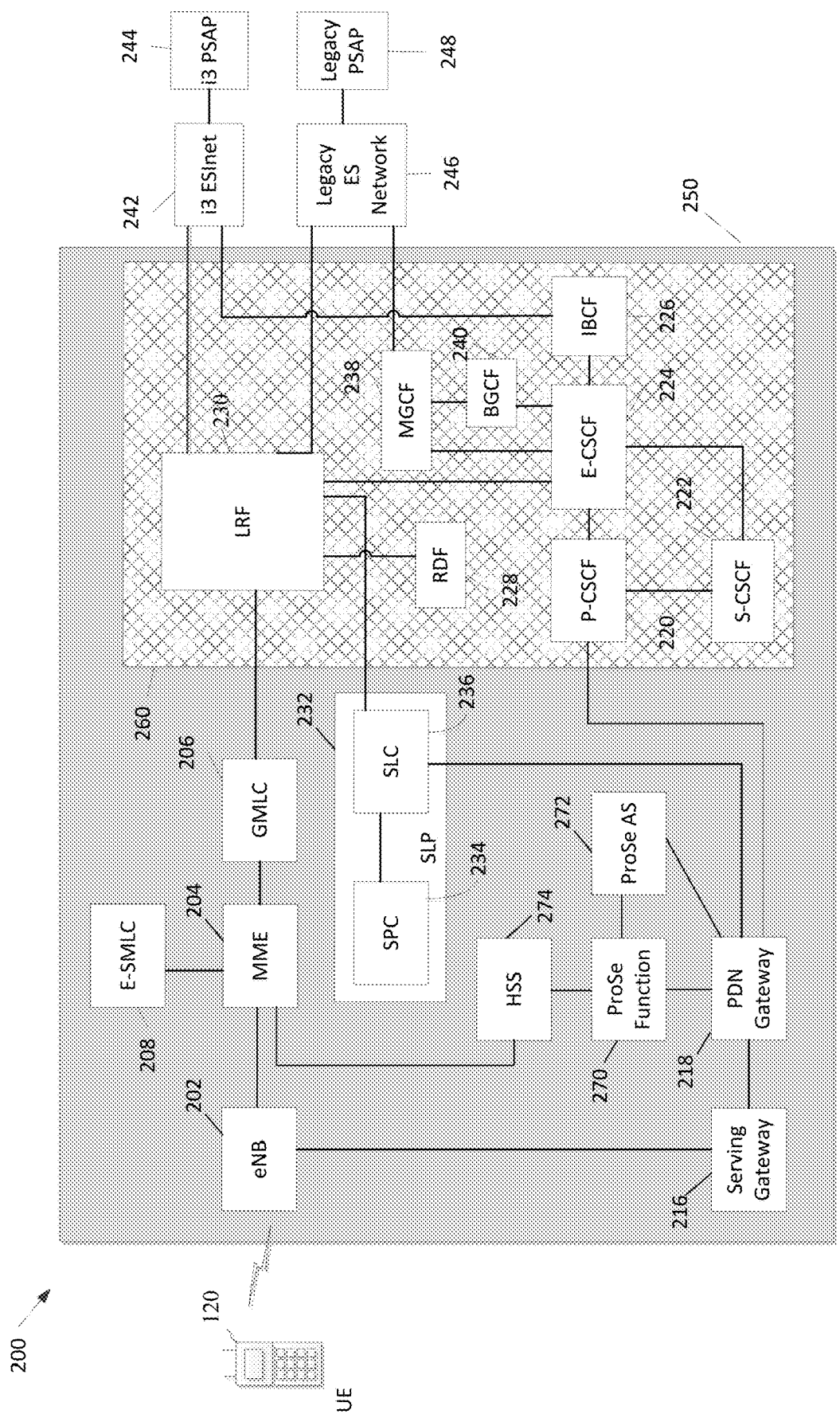
FIG. 2 shows a more detailed architecture for supporting emergency services to the user of a wireless device.

FIG. 2 shows an architecture of a system 200 for supporting an ES call from a UE 120 with 3GPP Long Term Evolution (LTE) access to a network 250. Network 250 may correspond to (e.g. may form all or part of) serving network 150, home network 190 or WWAN 130 in system 100. For simplicity, FIG. 2 shows one UE 120. However, as outlined in FIG. 1, additional UEs (e.g. UE 125) may also be communicatively coupled to network 250 and/or to UE 120. The network 250 may be an Evolved Packet System (EPS) that supports LTE access (e.g. by the UE 120) and possibly other access types (not shown in FIG. 2) such as cdma2000, Wideband CDMA (W-CDMA) and/or WiFi.

A UE 120 may communicate with a base station such as a serving evolved Node B (eNodeB or eNB) 202 in a radio access network (RAN) to obtain communication services from the network 250. The RAN (not explicitly shown in FIG. 2) may be part of network 250 and may include other network entities not shown in FIG. 2 for simplicity and may also be referred to as an Evolved Universal Terrestrial Radio Access Network (E-UTRAN).

The eNB 202 may also be referred to as a Node B, a base station, an access point, etc. The terms "access point" and "base station" are used interchangeably herein. UE 120 may (i) receive signals from eNB 202 and from other base stations (e.g. other eNBs) and APs in network 250; (ii) obtain the identities of the source eNBs and other base stations and/or obtain the identities of the source cells from the received signals and/or (iii) obtain measurements of the received signals such as measurements of time of arrival (TOA), reference signal time difference (RSTD) for OTDOA positioning, pilot phase for AFLT positioning, and/or signal strength (e.g. received signal strength indication (RSSI)), signal quality (e.g. signal to noise ratio (S/N)), and/or signal round trip propagation time (RTT) for enhanced cell ID (ECID) positioning. The eNB identities, base station identities and/or cell identities and the different signal measurements may be used to derive a location estimate for UE 120 (e.g. by UE 120 or by a location server such as E-SMLC 208 or Secure User Plane Location (SUPL) Location Platform (SLP) 232). While only one eNB 202 is depicted in FIG. 2, the architecture 200 (e.g. network 250) may include multiple eNBs and/or other base stations and/or APs, each with one or more antenna systems such as used with Distributed Antenna Systems (DAS), Remote Radio Heads (RRHs), Transmission Points (TPs), repeaters and relays.

The eNB 202 may communicate with a serving Mobility Management Entity (MME) 204 for UE 120, which may perform various control functions such as mobility management, Packet Data Network (PDN) gateway selection, authentication, bearer management, etc. MME 204 may communicate with an Enhanced Serving Mobile Location Center (E-SMLC) 208 and a Gateway Mobile Location Center (GMLC) 206.

The E-SMLC 208 may support UE-based, UE-assisted, network-based and/or network-assisted positioning methods for UEs including UE 120 and may support one or more MMEs. E-SMLC 208 may support the 3GPP control plane location solution for LTE access as defined in 3GPP Technical Specification 23.271 entitled "Functional stage 2 description of Location Services (LCS)" and 3GPP TS 36.305 entitled "Stage 2 functional specification of User Equipment (UE) positioning in E-UTRAN." The E-SMLC 208 may also be referred to as a location server (LS), a Stand Alone SMLC (SAS), etc. The GMLC 206 may perform various functions to support location services and provide services such as subscriber privacy, authorization, authentication, billing, etc. In Control Plane (CP) positioning, the signaling used to initiate a positioning event and the signaling related to the positioning event occur over the control channels of the cellular network.

A Location Retrieval Function (LRF) 230 may communicate with GMLC 206 and may route or help route IP-based ES calls to Public Safety Answering Points (PSAPs) such as the i3 Emergency Services IP network (ESInet) 242 and i3 PSAP 244, and well as legacy systems such as the legacy Emergency Services (ES) network 246 and the legacy PSAP 248. LRF 230 may also support location requests from PSAPs (e.g. PSAPs 244 and 248) for UEs (e.g. UE 120) that are making ES calls and may obtain locations for these UEs and return the locations to the requesting PSAPs.

In order to support the routing and location functions that LRF 230 performs, LRF 230 may be configured to request the locations of different target UEs (e.g. UE 120) from a GMLC such as GMLC 206. In that case, GMLC 206 may transfer any location request for a target UE (e.g. UE 120) to an MME such as MME 204 which may transfer the request to an E-SMLC such as E-SMLC 208. The E-SMLC (e.g. E-SMLC 208) may then obtain location related measurements for the target UE (e.g. UE 120). These measurements may be obtained by the E-SMLC: (a) from the serving eNB (e.g. eNB 202) for the target UE (e.g. UE 120); and/or (b) from the target UE (e.g. UE 120). Further, the E-SMLC (e.g. E-SMLC 208) may compute or verify any location estimate for the target UE (e.g. UE 120) and return the location estimate via the MME and GMLC (e.g. MME 204 and GMLC 206) to LRF 230.

In some embodiments, LRF 230 may additionally or alternatively be configured to request the locations of different target UEs (e.g. UE 120) from a Secure User Plane Location (SUPL) Location Platform (SLP) such as SLP 232. In User Plane (UP) positioning such as SUPL positioning, signaling to initiate and perform Location Based Services (LBS) functions may utilize user data connections (e.g. IP or TCP/IP connections) and appear as user data. In UP positioning, the location server may include or take the form of a SUPL Location Platform (SLP) (e.g. SLP 232). SLP 232 may include a SUPL Positioning Center (SPC) 234 and a SUPL Location Center (SLC) 236, and may be configured to communicate location information with the LRF 230 and support the SUPL user plane location solution defined by the Open Mobile Alliance (OMA) in order to obtain the locations of UEs such as UE 120.

A Serving Gateway 216 may perform various functions related to Internet Protocol (IP) data transfer for UEs such as UE 120 such as performing data routing and forwarding, mobility anchoring, etc. A Packet Data Network (PDN) Gateway 218 may perform various functions such as maintenance of data connectivity for UEs 120, IP address allocation, support of access to external data networks and/or a data intranet for network 250 etc.

In some embodiments, an IP Multimedia Subsystem (IMS) 260 for network 250 may include various network entities to support IMS services such as Voice-over-IP (VoIP) calls and VoIP ES calls. IMS is an architectural framework for delivering multimedia services over an IP packet switched network. IMS 260 may facilitate delivery of one or more of voice, video, data, etc., within the same session. In some embodiments, IMS may use the Session Initiation Protocol (SIP) to set up and control calls or sessions between UEs such as UE 120 and PSAP 244/248 and other entities.

The IMS 260 may include a Proxy Call Session Control Function (P-CSCF) 220, a Serving Call Session Control Function (S-CSCF) 222, an Emergency Call Session Control Function (E-CSCF) 224, a Breakout Gateway Control Function (BGCF) 240, a Media Gateway Control Function (MGCF) 238, an Interconnection Border Control Function (IBCF) 226, a Routing Determination Function (RDF) 228 and the LRF 230.

In some embodiments, network 250 may include a Proximity-based Services (ProSe) Function 270, a Proximity-based Services (ProSe) Application Server (AS) 272 and a Home Subscriber Server (HSS) 274. ProSe Function 270 may be connected directly or indirectly to PDN Gateway 218, ProSe AS 272 and HSS 274 and may interact with UE 120 (and possibly with UE 125) using Internet Protocol (IP) based signaling. ProSe Function 270 may be a logical or physical entity enabled to authorize and/or configure UE 120 (and possibly UE 125) to use LTE Direct communication. ProSe AS 272 may be connected to ProSe Function 270, may store data for support of LTE Direct communication (e.g. EPC ProSe User IDs, ProSe Function IDs, ProSe Discovery UE IDs) and may perform mapping of user IDs for LTE Direct communication (e.g. Application Layer User IDs and EPC ProSe User IDs). HSS 274 may be connected to ProSe Function 270 and to MME 204 and may store subscription data for UE 120 (and possibly for UE 125).

Figure 3:
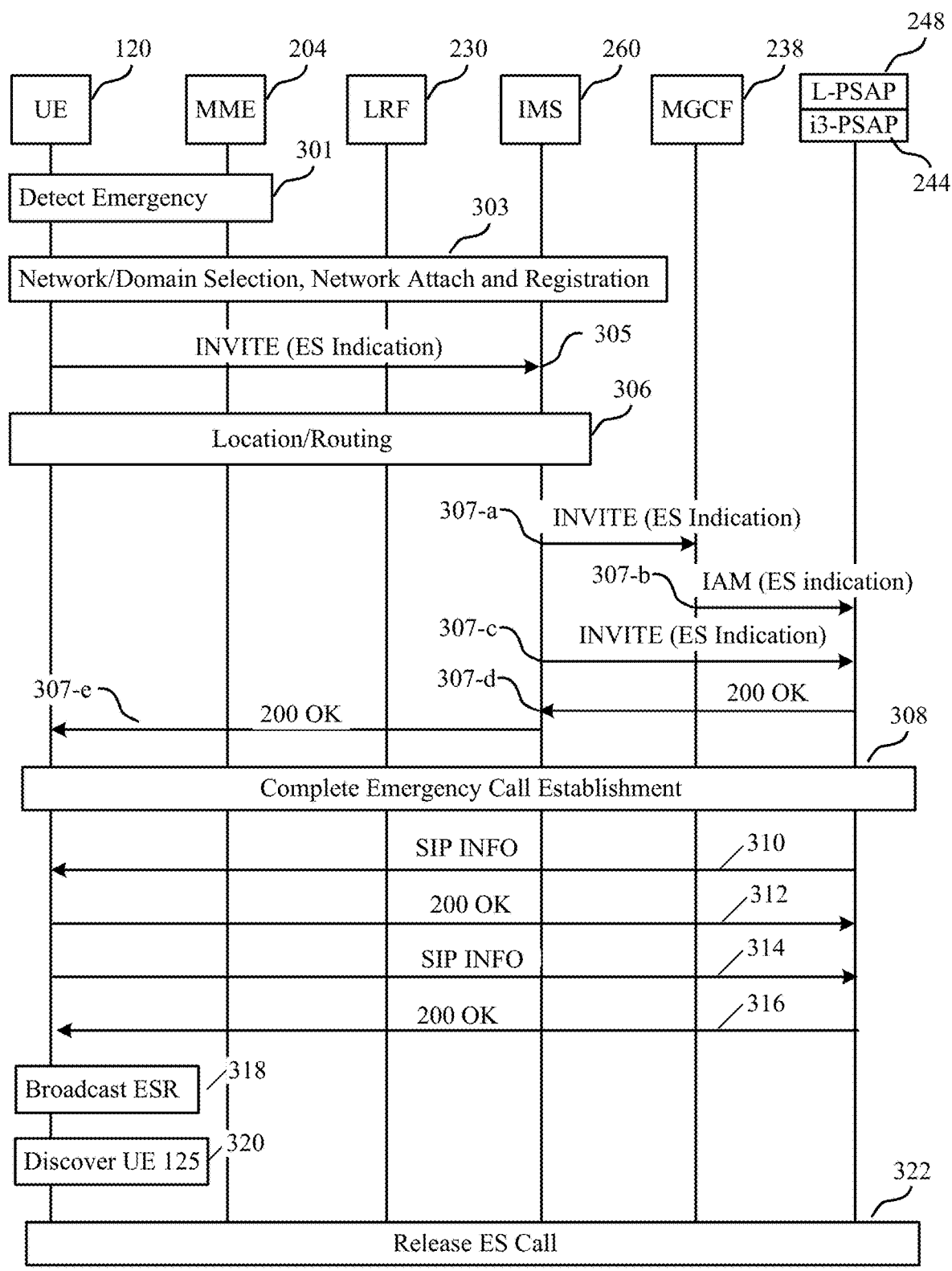
FIG. 3 shows an exemplary signaling flow for supporting emergency services to the user of a wireless device.

FIG. 3 shows an exemplary signaling flow 300 for establishing an ES call by UE 120 using network 250 in system 200 (shown in FIG. 2) and subsequently interacting with PSAP 244 or 248 in order to discover another UE 125 associated with another user (e.g. an ES responder) able to provide ES assistance. In signaling flow 300, network 250 may be a serving network for UE 120 and/or UE 125 (e.g. may correspond to serving network 150 in system 100).

At stage 301, the user of UE 120 detects an emergency situation and instigates an ES call on UE 120—e.g. by dialing the digits "911" (in the US) or "112" (in Europe). In some embodiments, the UE 120 may detect an emergency situation without user input (e.g. from measurements provided by a sensor attached to UE 120 or a sensor in communication with UE 120) and may automatically instigate the ES call at stage 301.

At stage 303, UE 120 may select a suitable network for the ES call, which, in this example, is the network 250; perform domain selection, which, in this example, is to select the packet switched (PS) domain for LTE access; attach to the network 250 (e.g. to the eNB 202, MME 204, Serving Gateway 216 and PDN Gateway 218) if not already attached; and perform an IMS emergency registration with the IMS 260 and with the home network 190 for UE 120 if network 250 is not the home network 190 for UE 120. The actions at stage 303 may correspond to some of those defined in 3GPP TS 23.167 entitled "IP Multimedia Subsystem (IMS) emergency sessions".

At stage 305, UE 120 sends a SIP INVITE message to IMS 260 (e.g. to P-CSCF 220 in IMS 260) and includes an ES indication (e.g. as described in 3GPP TS 23.167 and 24.229). UE 120 may also indicate in the SIP INVITE message at stage 305 a UE capability, referred to here as a "UE ESR capability", which may indicate that UE 120 may be able to: (a) broadcast an ESR message or signal; (b) discover and interact with another UE 125 in order to provide location and/or other information for UE 120 to the other UE 125; and/or (c) exchange information with a PSAP to allow the PSAP to coordinate or control the actions in (a) and/or (b). Actions (a), (b) and (c) may be similar to or the same as those described later in FIG. 4 for steps 432, 437-440 and 420, respectively. The UE ESR capability may be indicated by UE 120 indicating support in the SIP INVITE sent at stage 305 for a particular SIP INFO package as defined generically in IETF Request for Comments (RFC) 6086. In other embodiments, UE 120 may indicate the UE ESR capability by indicating its support for other SIP signaling methods such as a SIP MESSAGE, SIP UPDATE or SIP SUBSCRIBE and NOTIFY.

At stage 306, the IMS 260 (e.g. the E-CSCF 224) may query the LRF 230 to obtain call routing and/or location information for the UE 120 and the LRF 230 may obtain the location of the UE (e.g. via an interaction involving the MME 204 and/or UE 120) in order to provide call routing and/or location information.

At stage 307, the IMS 260 (e.g. the E-CSCF 224) uses any routing information obtained at stage 306 (e.g. provided by LRF 230) or selects an emergency center or PSAP based on information provided at stage 305 and sends the SIP INVITE message including the ES indication and UE ESR capability indication to or towards the emergency center or PSAP.

If the emergency center or PSAP is accessed over the Circuit Switched (CS) domain (e.g., the PSAP is a legacy PSAP 248), sub-stages 307-*a* and 307-*b* are performed. At sub-stage 307-*a*, the SIP INVITE is sent to MGCF 238. At sub-stage 307-*b*, the MGCF 238 sends an Integrated Services Digital Network (ISDN) User Part (ISUP) Initial Address Message (IAM) towards the legacy PSAP 248 (e.g. sends the IAM to the legacy Emergency Services (ES) network 246). The IAM may carry an ES indication (e.g. in a Calling Party's Category parameter) and a UE ESR capability indication (e.g. as part of the ES indication in a Calling Party's Category parameter). In some implementations, the UE ESR capability indication may be carried as part of a Called Party Number parameter (e.g. by including certain digits in the Called Party Number parameter) and may not be carried as a separate indication in the IAM.

If the emergency center or PSAP is accessed over the Packet Switched (PS) domain (e.g., the PSAP is i3 PSAP 244), sub-stages 307-c, 307-d and 307-e are performed. At sub-stage 307-c, the IMS 260 (e.g. E-CSCF 224) sends the SIP INVITE to or towards the i3 PSAP 244 (e.g. via IBCF 226 and i3 ESInet 242) carrying the ES indication and UE ESR capability indication. At sub-stage 307-d, the i3 PSAP 244 returns a SIP 200 OK message to the IMS 260 (e.g. to E-CSCF 224 via IBCF 226 and i3 ESInet 242). The SIP 200 OK message may carry an agreement to establish the ES call and may include a PSAP ESR capability indication for i3 PSAP 244. The PSAP ESR capability indication may be supported in a similar or identical manner to the UE ESR capability indication (e.g. may be an indication of i3 PSAP 244 support for a particular SIP INFO package). The PSAP ESR capability indication may indicate that i3 PSAP 244 is able to exchange information with UE 120 in order to allow i3 PSAP 244 to coordinate or control: (d) the broadcast of an ESR message or signal by UE 120; (e) discovery by UE 120 of UE 125; and/or (f) interaction by UE 120 with UE 125. Actions (d), (e) and (f) may be similar to or the same as those described later in FIG. 4 for steps 432, 437 and 440-450, respectively. At sub-stage 307-e: the IMS 260 (e.g. the E-CSCF 224 and P-CSCF 220) send the 200 OK message to the UE 120 and including any PSAP ESR capability indication.

When the ES call is sent to the legacy PSAP 248 over the CS domain as at sub-stages 307-a and 307-b, a message (not shown in FIG. 3) similar to the 200 OK at stage 307-d and 307-e, such as an ISUP Answer (ANM) message, may be sent by the legacy PSAP 248 following sub-stage 307-b. This message may also carry a PSAP ESR capability indication or a confirmation that any UE ESR capability indication sent to PSAP 248 at stage 307-b was received and is supported in some way by PSAP 248.

The emergency call establishment is completed at stage 308. This may include establishing a voice path (also referred to as a voice channel or audio channel) between the UE 120 and the PSAP (either legacy PSAP 248 or i3 PSAP 244). In the case of an ES call to i3 PSAP 244, the voice path may employ VoIP and may not need any conversion between different voice encodings. In the case of an ES call to legacy PSAP 248, the voice path may go through a Media Gateway (MGW) (not shown in FIG. 2 or FIG. 3) associated with the MGCF 238 and may undergo one or more transformations such as conversion between VoIP encoding and CS voice encoding at the MGW. The ES call established at stage 308 may be referred to as an "ES session" and may comprise both the voice path and the signaling path (e.g. used at stages 310-316) between UE 120 and PSAP 244/248.

Either during or after establishment of the ES call at stage 308, one or more of stages 310, 312, 314 and 316 may be performed when the ES Call goes to i3 PSAP 244 rather than to legacy PSAP 248. At stage 310, i3 PSAP 244 may send a SIP INFO message to UE 120 via IMS 260 (e.g. via E-CSCF 224 and P-CSCF 220). The SIP INFO message at stage 310 may include information indicating one or more of the following: (i) a request or command for UE 120 to broadcast an ESR message or signal; (ii) a particular ESR IE or an indication of a particular ESR IE to be included in an ESR broadcast signal; (iii) a particular public or private expression or reference to a particular public or private expression for LTE Direct broadcast of an ESR message or signal; (iv) discovery information for UE 120 (e.g. a temporary identity for UE 120); (v) discovery information for UE 125 (e.g. an identity or temporary identity for UE 125); (vi) types of location information to be provided by UE 120 to UE 125; (vii) frequencies and/or wireless types (e.g. WiFi Direct versus LTE Direct) to be used by UE 120 for ESR message or signal broadcast and discovery of UE 125; (viii) authentication parameters to be used by UE 120 to authenticate UE 125 and/or be authenticated by UE 125; (ix) a set of times and/or durations for broadcasting an ESR signal; and/or (x) a request for UE 120 to cease interaction with UE 125 and/or prepare to terminate the ES call with i3 PSAP 244. The information included in the SIP INFO message at stage 310 may be referred to as a "token" and may enable i3 PSAP 244 to control or assist UE 120 discovery of UE 125 (and/or UE 125 discovery of UE 120) and subsequent interaction of UE 120 with UE 125. UE 102 may respond to the SIP INFO received at stage 310 by sending a SIP 200 OK message to i3 PSAP 244 (e.g. via IMS 260) at stage 312. The SIP 200 OK sent at stage 312 may confirm receipt of the SIP INFO at stage 310 and may indicate agreement by UE 120 to perform the request/command and/or use the information received at stage 310.

In addition to or instead of performing stages 310 and 312, UE 120 may send a SIP INFO message to i3 PSAP 244 (e.g. via P-CSCF 220 and E-CSCF 224 in IMS 260) at stage 314. The SIP INFO message at stage 314 may include information indicating one or more of: (i) a request by UE 120 to broadcast an ESR message or signal; (ii) a request for information content (e.g. a token) for a broadcast ESR message or signal; (iii) a confirmation of previous broadcast of an ESR message or signal by UE 120; (iv) a confirmation of discovery by UE 120 of UE 125; (v) information for UE 125 discovered by UE 120 (e.g. an identity for UE 125); and/or (vi) a request for authentication parameters to authenticate UE 125 and/or be authenticated by UE 125. I3 PSAP 244 may return a SIP 200 OK message to UE 120 at stage 316 (e.g. via IMS 260) to confirm receipt of the SIP INFO received at stage 314. In some embodiments, the SIP INFO sent at stage 314 by UE 120 may be in response to the SIP INFO received at stage 310 from i3 PSAP 244—e.g. may confirm discovery by UE 120 of UE 125 if the SIP INFO at stage 310 requests or commands such discovery. In other embodiments, the SIP INFO sent at stage 314 by UE 120 may occur before the SIP INFO received at stage 310: in these embodiments, i3 PSAP 244 may respond to the SIP INFO received at stage 314 by returning to UE 120 in the SIP INFO sent at stage 310 information (e.g. a token) to assist UE 120 to discover, authenticate and/or interact with UE 125.

In some embodiments, stages 310-312 and/or stages 314-316 may be repeated—e.g. to enable i3 PSAP 244 to provide more information and instructions to UE 120 with regard to discovery and interaction with UE 125 or additional UEs 125 and/or to enable UE 120 to provide more information or more request for information to i3 PSAP 24 regarding discovery and/or interaction with UE(s) 125.

In some embodiments, some or all information that may be carried in the SIP INFO sent by UE 120 at stage 314 may be included in the SIP INVITE sent at stage 305 and sub-stage 307-c. In some embodiments, some or all information that may be carried in the SIP INFO sent by i3 PSAP 244 at stage 310 (e.g. a token) may be included in the SIP 200 OK sent at sub-stage 307-d and 307-e. In some embodiments, other SIP messages may be sent at stage 310 and/or at stage 314 different to a SIP INFO but carrying the same or similar information. These other messages may comprise a SIP UPDATE, SIP MESSAGE, SIP SUBSCRIBE, SIP NOTIFY and/or a SIP PUBLISH. In some embodiments, the original sender of the SIP INFO (or other SIP message) at stage 310 and the final receiver of the SIP INFO (or other SIP message) at stage 314 may not be i3 PSAP 244 but may instead be an entity in i3 ESInet 242 or an entity in IMS 260 (e.g. E-CSCF 224 or LRF 230).

In the case that the ES call goes to legacy PSAP 248 and not to i3 PSAP 244, the SIP messages exchanged at stages 310-316 may be replaced by different messages or signaling in which ISUP messages are sent and received between PSAP 244 and MGCF 238 and SIP messages (e.g. SIP INFO messages) are sent and received between MGCF 238 and UE 120 carrying the same or similar information to that described previously for stages 310-316. Here, MGCF 238 may convert ISUP messages sent by PSAP 248 into SIP messages sent to UE 120 and may convert SIP messages sent by UE 120 into ISUP messages sent to PSAP 248. Alternatively, the SIP messages exchanged at stages 310-316 may be replaced by inband communication between UE 120 and PSAP 248 using the voice path established at stage 308.

During or following ES call establishment at stage 308 and possibly following one or more instances of SIP INFO message transfer as described for stages 310-312 and/or stages 314-316, UE 120 broadcasts an ESR signal or ESR message at stage 318 as described in association with FIG. 1 and FIG. 2. ESR broadcast at stage 318 may be triggered or instigated by one or more SIP INFO messages sent at stage 310 and/or stage 314—e.g., ESR broadcast may be instigated by a request (or a token) received by UE 120 from PSAP 248 or i3 PSAP 244 at stage 310. Following ESR broadcast at stage 318, UE 120 may discover UE 125 at stage 320 and subsequently may interact with UE 125 (e.g. authenticate UE 125, be authenticated by UE 125 and/or provide UE 120 location information to UE 125). At stage 322, the ES call may be released—e.g. by PSAP 248 or i3 PSAP 244.

As described above for signaling flow 300, UE 120 may receive a token and/or other information from a PSAP 244 or 248 (or an entity in an i3 ESInet 242 or IMS 260) while establishing or after having established as ES call with the PSAP. For example, in the exemplary signaling flow 300, the token may be received by UE 120 as an IE or a set of IEs that are included in the 200 OK received at sub-stage 307-*e* or the SIP INFO received at stage 310. The term "token" is used herein to refer to a portion of the information conveyed by a PSAP to UE 120. The token may comprise a unique identifier for UE 120 assigned by the PSAP (e.g. PSAP 244/248). In some embodiments, the token may also or instead be sent to responder UEs (e.g. UE 125) along with other information pertaining to the ES request. The first UE (e.g. UE 120 initiating the ES request) may send the token, or part of the token, to the second UE (e.g. UE 125) during communication. The token (or part of the token) received by the second UE from the first UE may be compared with a token (or part of a token) received by the second UE (e.g. UE 125) from a PSAP (e.g. PSAP 244/248) to help identify and/or authenticate the first UE. Alternatively, or additionally, the token may include a non-unique indication of an emergency situation that can be recognized by the second UE (e.g. UE 125). The token may further include additional information such as: (i) a request or command for UE 120 to broadcast an ESR message or signal (e.g. as described in association with FIG. 1 and FIG. 4); (ii) a particular ESR IE or an indication of a particular ESR IE to be included in an ESR broadcast message or signal; (iii) a particular public or private expression or reference to a particular public or private expression for LTE Direct broadcast of an ESR message or signal; (iv) discovery information for UE 120 (e.g. a temporary identity for UE 120); (v) discovery information for UE 125 (e.g. an identity or temporary identity for UE 125); (vi) types of location information to be provided by UE 120 to UE 125; (vii) frequencies and/or wireless types (e.g. WiFi Direct versus LTE Direct) to be used by UE 120 for ESR signal or message broadcast and discovery of UE 125; (viii) authentication parameters to be used by UE 120 to authenticate UE 125 and/or be authenticated by UE 125; (ix) a set of times and/or durations for broadcasting an ESR message or signal; and/or (x) a request for UE 120 to cease interaction with UE 125 and/or prepare to terminate the ES call with a PSAP (e.g. i3 PSAP 244 or legacy PSAP 248).

In some embodiments, the token or part of the token may be sent by UE 120 during a WiFi Direct, LTE Direct and/or P2P discovery related ESR broadcast at stage 318, and/or during a secure communication session with UE 125 (not shown in FIG. 3) established after discovery of UE 125 at stage 320. For example, the token may provide an indication to an ES responder associated with UE 125 that the emergency has been verified (e.g. by the PSAP and/or another authority) and may facilitate emergency related communication between UEs 120 and 125.

Figure 4:
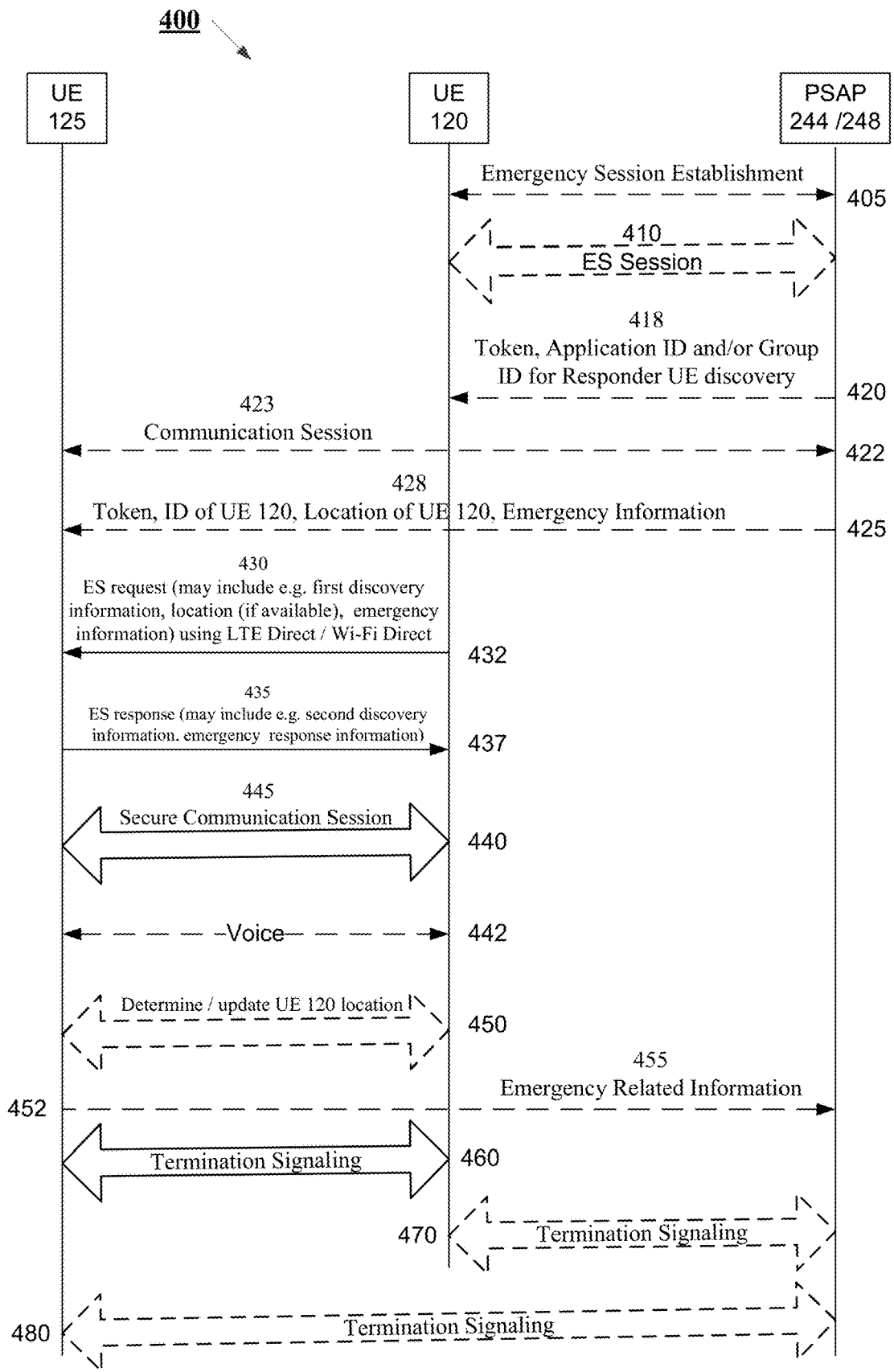
FIG. 4 shows another exemplary signaling flow for supporting emergency services to the user of a wireless device.

FIG. 4 shows an exemplary high level signaling flow 400 between UE 120, which may initiate an emergency session, a PSAP 244 or 248, and another UE 125. In FIG. 4, dashed lines are used to indicate portions that may be optional in some situations.

In step 405, UE 120 may, in some instances, detect an emergency situation and perform procedures to establish an ES session 410 with PSAP 244/248. For example, step 405 may comprise one or more of stages 301-308 in signaling flow 300, described in relation to FIG. 3. In some instances, the ES session 410 may be initiated over WLAN 140 and/or WWAN 130. For example, UE 120 may initiate ES session 410 over an LTE network (e.g. network 250). UE 120 and PSAP 244/248 may exchange emergency related information using ES session 410—e.g. as described for stages 310-316 in signaling flow 300.

In some instances, in step 420, during or following ES session 410 establishment, UE 120 may receive one or more messages 418 from PSAP 244/248, which may include one or more of: a token, location information for UE 120 (e.g. if the location of UE 120 was determined by network 250 based on measurements by UE 120 and provided by network 250 to PSAP 244/248), an Application ID (e.g. for an application related to ESR) and discovery information (e.g. such as a ProSe Application code or ProSe Restricted code for discovery of responder UE 125). Messages 418 may correspond to or include a SIP 200 OK message, as sent at sub-stages 307-*d* and 307-*e* in signaling flow 300, and/or a SIP INFO (or other message such as a SIP UPDATE) sent at stage 310 in signaling flow 300. A token received in any of one or more messages 418 may be as described in association with signaling flow 300.

In some instances, in step 422, UE 125 may establish a communication session 423 with PSAP 244/248. For example, the communication session 423 between UE 125 and PSAP 244/248 may be instigated by either UE 125 or PSAP 244/248 and/or may be established in a similar manner to the ES session 410 (e.g. may include indication of support for a SIP INFO package by UE 125 and PSAP 244/248). However, unlike ES session 410, communication session 423 may be established as a non-ES session. In some instances, communication session 423 may be a secure communication session (e.g. with mutual authentication between UE 125 and PSAP 424/428 and/or ciphering of communication between UE 125 and PSAP 424/428) and may support voice and/or data transfer between UE 125 and PSAP 424/428. In some instances, UE 125 may send a message to PSAP 244/248 (e.g. a SIP INVITE message and not shown in FIG. 4) as part of step 422 in order to establish communication session 423. In some instances, steps 422 and 425 (described next) may occur before step 432 (described later)—e.g. if UE 125 belongs to a public safety responder dispatched by PSAP 244/248 to the general location of UE 120. In some instances, steps 422 and 425 may occur after step 432 (e.g. if UE 125 belongs to an authorized responder nearby to UE 120 and is not dispatched by PSAP 244/248): in these instances, steps 422 and 425 may be triggered by step 432.

In some instances, in step 425, UE 125 may receive one or more messages 428 from PSAP 244/248 using communication session 423, which may include one or more of: the token, an identifier or identity for UE 120, a temporary identifier for UE 120, an emergency identifier (which may form part of the token), location information for UE 120, and additional information pertaining to the emergency (e.g. based, in part, on information reported by the user/UE 120 to PSAP 244/248 in relation to the emergency). In some embodiments, messages 428 may be similar to or the same as messages 418—e.g. may include a SIP 200 OK, SIP INFO or SIP UPDATE message. In other embodiments, messages 428 may be sent as data—e.g. using TCP/IP.

In some embodiments, the token, if received in step 425, may provide an indication to a responder associated with UE 125 that the emergency situation for UE 120 has been verified (e.g. by the PSAP 244/248 or by another authority) and may facilitate establishment of a secure communication session 445 between UE 120 and UE 125 as described later for step 440.

In some embodiments, message(s) 428 may include additional information such as information about the nature of the emergency (fire, medical, etc.), which may be based, on emergency related information provided to the PSAP 244/248 and/or to the PSAP 244/248 operator by UE 120 (e.g. as described for stages 305 and 314 for signaling flow 300) and/or by the user of UE 120. The additional information may indicate whether the emergency situation pertains directly to the user of UE 120 or whether this user is reporting a witnessed emergency (e.g. a car accident not involving the user). The additional information may allow responders to determine whether the location of the UE 120 user is relevant to the emergency and/or to locate the UE 120 (e.g. for witness statements or to obtain additional information etc.) during or subsequent to the emergency situation. For an emergency situation involving the UE 120 user, the additional information may indicate the status of the user of UE 120—e.g. whether injured, trapped, still in danger, etc. The information conveyed in messages 428 to UE 125 may assist or enable the discovery of UE 120 by UE 125, the establishment of a secure communication session and voice session between UEs 125 and 120, and/or the location of UE 120 by UE 125 as described later for steps 432-450.

In some embodiments, establishment of the communication session 423 in step 422 and receipt of the message(s) 428 at step 425 may be performed by an application on UE 125. Moreover, the same application on UE 125 may also perform some or all of steps 432-460 as described later.

The order of steps 420 and 425 shown in FIG. 4 is merely exemplary. For example, in some instances, step 425 may occur prior to step 420. Further, in some embodiments, step 420 may occur as part of emergency session 410. In some embodiments, steps 405 and/or 420 may not occur—e.g. if UE 120 is unable to establish an ES session due to unavailability of network 250 or if UE 120 or PSAP 244/248 does not support steps 405 and/or 420. In some embodiments, steps 422 and 425 may not occur—e.g. if the user of UE 125 is not a public safety responder, if UE 125 or PSAP 244/248 does not support steps 422 and 425, or if step 405 and/or step 420 do not occur.

In step 432, message 430 may be sent by UE 120 to UE 125. In some embodiments, message 430 may be an ES Request. In some embodiments, message 430 may include first discovery information (e.g. discovery information for communication with UE 120 such as a UE identifier, group ID, service type, and/or application ID associated with UE 120). In some embodiments, message 430 may optionally include one or more of: an emergency indication, location information for UE 120 (if available), the token or part of the token (e.g. received from PSAP 244/248 in step 420), emergency related information etc. In some embodiments, message 430 may be sent by broadcast using one or more of: WiFi Direct, LTE Direct and/or some other P2P service. In these embodiments, message 430 may not be directed specifically to UE 125 but may instead be broadcast to any UE 125 that is nearby to UE 120 and willing and able to receive message 430. Furthermore in some embodiments, message 430 may comprise more than one message—e.g. may comprise an initial message sent via broadcast to initiate discovery of UE 120 by UE 125 (and discovery of UE 125 by UE 120) and one or more subsequent messages which may deliver some or all of the information attributed previously to message 430. In some embodiments, step 432 may correspond to stage 318 in signaling flow 300.

In some embodiments, UE 120 may be configured to automatically initiate step 432 (and step 405 if step 405 occurs) via an LTE Direct ESR broadcast, a WiFi Direct broadcast with an ESR indication and/or another P2P ESR broadcast upon detection of an emergency. For example, when a smoke detector or carbon monoxide detector associated with (e.g. connected to) UE 120 is triggered, one or more of an LTE Direct, WiFi Direct and/or P2P ESR broadcast may be automatically initiated for step 432. As another example, a medical device associated with UE 120 (e.g. an implanted, wearable, or user-coupled device monitoring a medical condition) may cause UE 120 to initiate an ESR broadcast (either directly or through an application on UE 120) when an emergency is detected. As a further example, a user of UE 120 may manually trigger the LTE Direct, WiFi Direct and/or P2P ESR transmission for step 432 by initiating an ES session establishment (e.g. at step 405), or by invoking an ES related application on UE 120. For example, UE 120 or an application on UE 120 may be configured to initiate step 432 whenever UE 120 instigates an ES call or whenever a particular trigger condition (e.g. such as detection of a user medical condition) causes UE 120 to instigate an ES call. The examples above are merely illustrative and various other situations to automatically or manually initiate ESR broadcasts at step 432 are envisaged. In general, when sensors are used to detect an emergency situation, an ESR broadcast at step 432 may be initiated (e.g. using LTE Direct, WiFi Direct and/or P2P) automatically upon detection of the emergency situation.

In some embodiments, UE 120 may be configured to initiate step 432 due to instructions or information received in one or more messages 418 from PSAP 244/248 in step 420. For example, one or more messages 418 may include instructions for UE to initiate step 432 immediately or at some later specified time. The instructions may also indicate how to broadcast message 430 (e.g. whether to use LTE Direct, WiFi Direct, a P2P service or some combination of these), which frequencies and/or channels to use for the broadcast, a power level for the broadcast and/or an interval of time to continue the broadcast. One or more messages 418 may further include a token and/or other information containing signaling content (e.g. an ESR IE, a ProSe Application code or a ProSe Restricted code) for message(s) 430. These embodiments may enable PSAP 244/248 or an operator for PSAP 244/248 to control broadcasting of message(s) 430 by UE 120. For example, PSAP 244/248 may not request UE 120 to perform step 432 in an emergency situation where ES responders have just been dispatched to the location of UE 120, but may request UE 120 to perform step 432 when ES responders are not available to be dispatched to the location of UE 120 or when ES responders have been dispatched to the location of UE 120 but are unable to find UE 120 and the user of UE 120.

In some embodiments, for WiFi Direct, UE 120 may include ESR related information in an ESR IE in message(s) 430. In some embodiments, the ESR IE may form part of the broadcast of WiFi Direct discovery information for UE 120 in step 432. In some embodiments, the ESR IE may be a sub-field of an existing IE (e.g. part of a frame body and/or a vendor specific IE) of an 802.11x MAC header frame broadcast during WiFi Direct discovery.

In some embodiments, for LTE Direct, UE 120 may broadcast an ESR expression at step 432, where the ESR expression corresponds to or forms part of message 430. The ESR expression may include one or more of: a name (e.g. of the expression); a code, which may comprise discovery information (e.g. to communicate with UE 120); and metadata or information elements. These information elements may include: an emergency indication, an application indication or identifier, a location (e.g. of UE 120), information about the nature of the emergency (e.g. medical, fire etc.). The ESR expression may be a "public expression," which is capable of being recognized by a wide array of UEs 125 that support LTE Direct), or a "private expression," which may be recognized only by appropriately configured UEs 125— e.g. a UE 125 belonging to a medical responder (e.g. doctor or nurse) or a public safety responder (e.g. police, fire rescue, ambulance crew).

In step 437, UE 125 may send message 435 which may be received by UE 120. In some embodiments, message 435 may be an ES response. In some embodiments, message 435 may include second discovery information for communication with UE 125 (such as an identifier, group ID, and/or application ID associated with UE 125). In some embodiments, message 435 may optionally include one or more of: emergency response related information (such as an estimated response time, instructions related to the emergency) etc. In some embodiments, message 435 may be sent using the same service (WiFi Direct, LTE Direct and/or P2P service) that was used to send message 430. Furthermore in some embodiments, message 435 may comprise more than one message—e.g. may comprise an initial message sent to enable discovery of UE 125 by UE 120 (and discovery of UE 120 by UE 125) and one or more subsequent messages which may deliver some or all of the information attributed previously to message 435. In some embodiments, step 437 may correspond to stage 320 in signaling flow 300.

When communicating using WiFi Direct, in some embodiments, UE 125 may monitor WiFi Direct transmissions for the presence of ESR information in an ESR IE. When ESR information is detected by UE 125 in a WiFi Direct transmission (e.g. as at step 432), UE 125 may respond with message 435. Message 435 may include one or more of: an indication of ES support or additional discovery related information (e.g. for communication with UE 125).

When communicating using LTE Direct, in some embodiments, UE 125, which may monitor broadcasts for emergency service related expressions, may detect the ESR expression (e.g. sent by UE 120 in step 432) and respond to UE 120 (e.g. in step 437). In some embodiments, UE 125 may communicate with an Expression Name Server (ENS) to obtain additional information about the ESR expression broadcast by UE 120.

In step 440, UE 120 and UE 125 may establish a secure communication session 445 using the appropriate service (e.g. LTE Direct, WiFi Direct and/or P2P) based on the discovery information exchanged in steps 432 and 437. As part of establishing the secure communication session 445, UE 120 may authenticate UE 125 and/or vice versa. The authentication may be useful or essential to ensure that the secure communication session 445 is established between both UE 120 and UE 125 and does not include some other UE at one end or the other. In order to authenticate UE 125, UE 120 may be configured with security related information (e.g. the known public key of a public key-private key pair used by authorized ES responders) that may be used to authenticate UE 125 using some known authentication mechanism such as a mechanism supported by the Transport Layer Security (TLS) protocol defined in the Internet Engineering Task Force (IETF) Request For Comments (RFC) 2246 entitled, "The TLS Protocol Version 1.0", and in RFC 4346 entitled "The Transport Layer Security (TLS) Protocol Version 1.1". Alternatively or in addition, PSAP 244/248 may provide UE 120 with security information in message 418 sent at step 420 which may include an identity for UE 125 and/or authentication data such a shared secret key or the public key of a public key-private key pair which may be used by UE 120 to identify and/or authenticate UE 125. Similarly, UE 125 may be configured with security related information (e.g. the known public key of a public key-private key pair used by UEs such as UE 120), which may be used to authenticate UE 120 using some known authentication mechanism such as a mechanism supported by the Transport Layer Security (TLS) protocol defined in IETF RFC 2246. Alternatively or in addition, PSAP 244/248 may provide UE 125 with security information in message 428 sent at step 425 which may include an identity for UE 120 and/or authentication data such a shared secret key or the public key of a public key-private key pair which may be used by UE 125 to identify and/or authenticate UE 120. In some embodiments, the same or similar authentication data may be sent by PSAP 240/248 to UE 120 in message 418 at step 420 and to UE 125 in message 428 at step 425 to enable UEs 120 and 125 to mutually authenticate one another. Following or during establishment of secure communication session 445, UEs 120 and 125 may negotiate ciphering for secure communication session 445 (e.g. as part of authentication or mutual authentication).

During secure communication session 445, UEs 120 and 125 may exchange additional emergency related information. The additional emergency related information may include one or more of: an application ID, an identifier for the emergency, a location (e.g. of UE 120), information about the nature of the emergency (e.g. medical, fire etc.), and/or other relevant information.

In some embodiments, in step 442, a voice channel may optionally be established between UE 120 and UE 125. The voice channel may facilitate communication between a user of UE 120 and a responder associated with UE 125.

In some embodiments, in step 450, UE 120 and/or UE 125 may optionally transmit signals and/or position related information to UE 125 and/or UE 120, respectively, during secure communication session 445 to facilitate determination of a position of UE 120 by UE 125. For example, position related information may comprise timing, ranging, and/or direction finding information. UE 125 and/or UE 120 may measure any signals transmitted by UE 120 and/or UE 125, respectively, in step 450 and/or may use position related information transmitted by UE 120 and/or UE 125, respectively, in step 450 in order to obtain one or more measurements such as an RSSI, RTT, AoA, or AoD. UE 125 (or UE 120) may then use the measurements to determine, or help determine, a location of UE 120. In some embodiments, Fine Timing Measurements (FTM) (e.g. as defined by IEEE 802.11) or other established procedures may be used by UE 125 (or UE 120) to determine and/or update a location of UE 120. In some embodiments, the location of UE 120 determined may be absolute (e.g. coordinates of a location of UE 120 in some frame of reference) or relative (in relation to a current position of a UE 125).

UEs 120 and 125 may use secure communication session 445 to enable or assist location of UE 120 and/or UE 125 in step 450. For example, the secure communication session 445 may enable or assist: (i) UE 125 to request measurement information from UE 120 (or vice versa); (ii) UE 120 to send measurement information to UE 125 (or vice versa); and/or (iii) signals that are part of secure communication session 445 that can be measured by UE 120 and/or UE 125. Location measurements that are enabled or assisted by secure communication session 445 may include a round trip signal propagation time (RTT) between UEs 120 and 125, an AOA, RSSI and/or S/N of a signal sent by UE 120 and received by UE 125 (or vice versa). The location measurements may enable UE 125 to obtain the location of UE 120 relative to UE 125 (or vice versa) and/or may enable UE 125 to obtain an absolute location of UE 120 (or vice versa). In some embodiments, location measurements sent by UE 120 to UE 125 (or vice versa) using secure communication session 445 may be location measurements for base stations and/or access points nearby to UE 120 (e.g. part of WWAN 130 and/or WLAN 140) such as WiFi APs or Bluetooth® beacons. UE 125 (or UE 120) that receives these location measurements may use a location server (e.g. E-SMLC 208 or SLP 232) or a location service to obtain a location from the location measurements.

An ES responder associated with UE 125 may use a location of UE 120 obtained by UE 125 at step 450 to help find the user of UE 120 and provide ES related assistance. For example, if the ES responder associated with UE 125 was dispatched by PSAP 244/248 to an approximate location for UE 120 obtained by PSAP 244/248 during or following emergency session establishment at step 405, the ES responder may use the location of UE 120 obtained at step 450 as a more accurate location for UE 120 that may enable the ES responder to find and come to the assistance of the user for UE 120. A similar procedure may occur if UE 120 obtains the location of UE 125—e.g. to help enable the user of UE 120 to find the ES responder associated with UE 125 (e.g. if the user of UE 120 is in a dangerous location and needs to move to a safer location occupied by UE 125).

In an embodiment, more than one UE 125 may obtain location information for UE 120 at step 450. For example, a plurality of UEs 125 at different locations nearby to UE 120 may each obtain location measurements for UE 120— e.g. RTT, AOA, RSSI and/or S/N measurements. In addition, each of the plurality of UEs 125 may perform some or all of steps 425-442 to obtain information for UE 120 from PSAP 424/428, discover UE 120, establish a secure communication session with UE 120 and/or establish a voice session with UE 120. Each of the plurality of UEs 125 may further discover, and establish secure communication sessions with, one or more others in the plurality of UEs 125 (not shown in FIG. 4) and may use the secure communication sessions to exchange and share location measurements obtained for UE 120. The exchange and sharing of location measurements for UE 120 by UEs in the plurality of UEs 125 may enable one or more of the plurality of UEs 125 to obtain a location for UE 120—e.g. based on the location measurements for UE 120 that are exchanged and shared and the known absolute or relative locations for some or all UEs in the plurality of UEs 125, and using location techniques like triangulation, trilateration or multilateration. The location for UE 120 obtained by one or more UEs in the plurality of UEs 125 may be more accurate and/or more reliable than a location for UE 120 obtained by just one UE 125 acting alone due to combining location measurements from multiple sources at different locations. As an example, this embodiment may be used when several public safety responders are dispatched to the approximate location of UE 120 by PSAP 244/248 and the public safety responders each possess a UE 125 and are able to approach the location of UE 125 from different directions. In a variant of this embodiment, a user associated with a single UE 125 may obtain location measurements for UE 120 at different locations for UE 125 and at different times and combine the location measurements to obtain a location for UE 120 that is more reliable and/or more accurate than a location for UE 120 obtained by UE 125 using location measurements obtained from just one location of UE 125.

In step 452, UE 125 may optionally send emergency related information 455 to PSAP 244/248. The emergency related information 455 may include a location for UE 120 (e.g. obtained by UE 125 at step 450 or step 432), an identity for UE 120, information concerning the ES situation for UE 120 (e.g. whether yet resolved or not).

Steps 420, 422, 425, 440, 442, 450, and 452 may occur in a different order from that shown in FIG. 4. Further, steps 420, 425, 442, 450, and 452 may occur more than once during message flow 400.

In step 460, UEs 120 and 125 may perform emergency termination signaling to indicate that the emergency has been addressed. For example, emergency termination signaling may comprise releasing the secure communication session 445. Emergency termination signaling may be initiated by either UE 120 and/or UE 125 in accordance with any prevailing protocol. Upon completion of emergency termination signaling, ES related LTE Direct and/or WiFi Direct and/or P2P transmissions from UE 120 and/or UE 125 may be stopped.

In step 470, when an ES session 410 was established between UE 120 and PSAP 244/248, UE 120 and PSAP 244/248 may perform termination signaling to indicate that the emergency has been addressed or will later be addressed. Termination signaling may be initiated by either UE 120 and/or PSAP 244/248 in accordance with any prevailing protocol. Termination signaling may release the ES session 410. Step 470 may be performed prior to some or all of steps 422-460 in some embodiments.

In step 480, when a communication session 423 was established between UE 125 and PSAP 244/248, UE 125 and PSAP 244/248 may perform termination signaling to indicate that the emergency has been addressed or will later be addressed. Emergency termination signaling may be initiated by either UE 125 and/or PSAP 244/248 in accordance with any prevailing protocol. Termination signaling may release the communication session 423 between UE 125 and PSAP 244/248. Step 480 may be performed prior to some or all of steps 432-470 in some embodiments.

The term "emergency responder," or "responder" as used herein may also apply to authorized and/or available personnel (e.g. doctors, medical professionals, security personnel. etc.) in the vicinity of the emergency response event. For example, responder UE 125 may be configured to monitor ESR broadcasts from other UEs such as UE 120. In some embodiments, UE 125 may include applications to monitor and respond to ESR broadcasts from a UE 120. As one example, for LTE Direct, authorized responders may have UEs 125 configured with applications to monitor and respond to appropriate ESR expressions. For example, an LTE Direct ESR expression indicating a medical emergency may activate an application on a UE 125 registered to a medical professional in the vicinity of UE 120. Similarly, an LTE Direct ESR indicating a security emergency may activate the application on a UE 125 registered to a certified security professional in the vicinity of UE 120. As outlined above, the ESR expression may be a general expression, which, in some implementations may include an emergency type; or, separate ESR expressions may be created for various types of emergencies. In some embodiments, the mode of expression (public or private) may be automatically selected based on the type of emergency.

Figure 5:
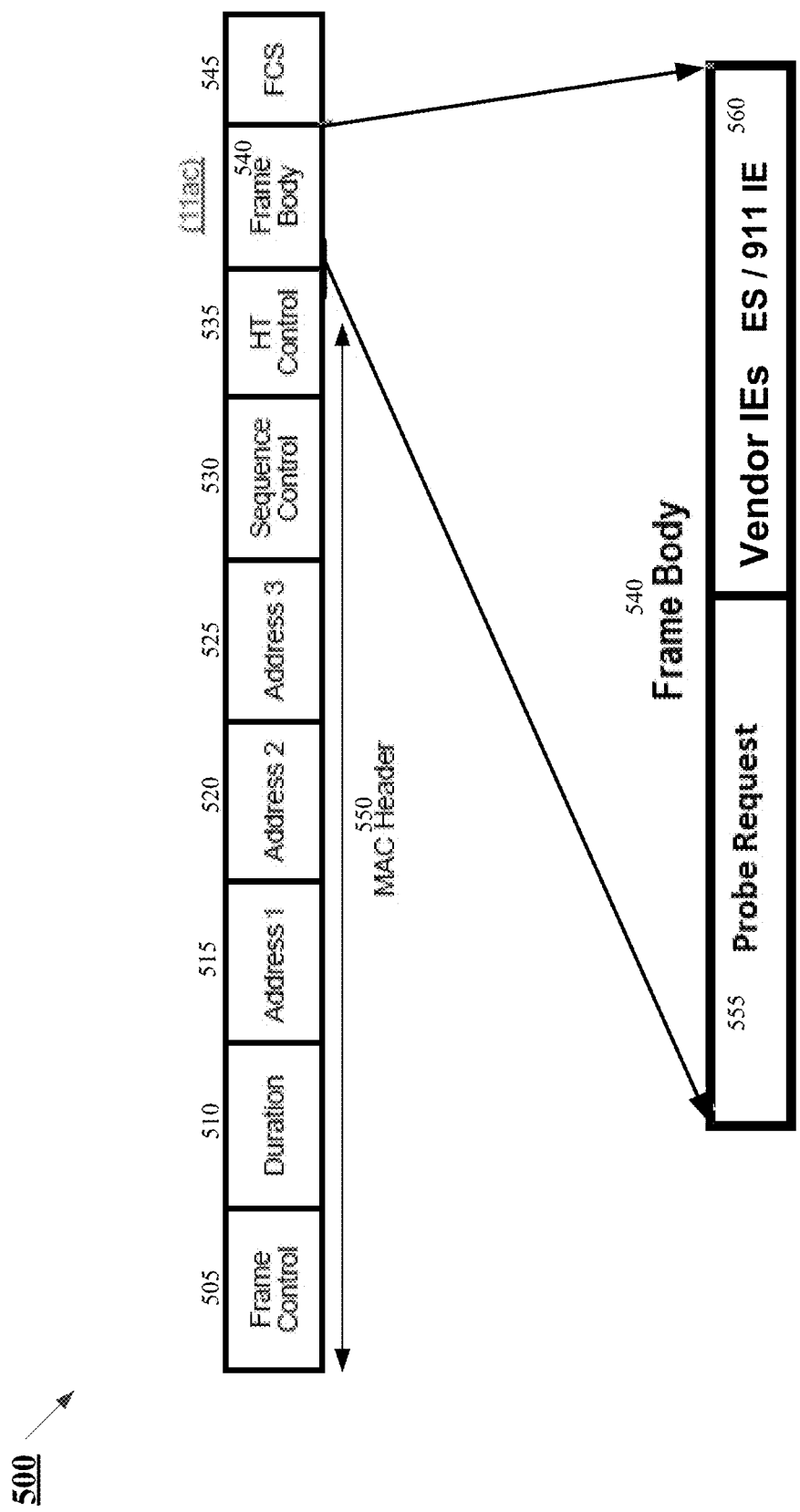
FIG. 5 shows an exemplary WiFi Direct signaling content which may be used to support emergency services to the user of a wireless device.

FIG. 5 shows an exemplary WiFi Direct frame 500, which may be used to transmit message(s) 430 (e.g. an ES request) and message 435 (e.g. an ES response), and/or in other communications between a UE 120 signaling distress and responding UEs 125. As shown in FIG. 5, in some embodiments, exemplary frame 500 may comprises fields or information elements (IEs) Frame Control field 505, Duration field 510, Address 1 field 515, Address 2 field 520, Address 3 field 525, Sequence Control field 530, HT Control field 540, Frame Body field 545, and FCS field 545. Frame Control field 505, Duration field 510, Address 1 field 515, Address 2 field 520, Address 3 field 525, Sequence Control field 530, and HT Control field 540 may form part of a Medium Access Control (MAC) Header 550. The definitions of and use of information in MAC Header 550 is well-known and is available, for example, in "Part 11: Wireless LAN Medium Access Control (MAC) and Physical Layer (PHY) Specifications," 2013, which is published by the IEEE and forms part of the 802.11ac standard.

In some embodiments, information in Frame Control field 505 may be used to interpret information in other fields in frame 500. In some embodiments, the information in Frame Control field 505 may be used to indicate that an ESR related information is present (e.g. in an ESR IE) in message 430.

The Duration field 510 carries the value of the Network Allocation Vector (NAV) and access to the medium is restricted for the time specified by the NAV. In some embodiments, Address 1 field 515 may represent the destination of frame 500. Address 2 field 520 may include the address of the source UE (e.g. UE 120 or UE 125) transmitting the frame. Address 3 field 525 may include the BSSID (e.g. (a) of a WiFi AP associated with the source UE, or (b) the address of the source UE, if the source UE serves as an AP, or (c) the BSSID of an Independent Basic Service Set (IBSS)). The HT Control field 535 includes information to identify the type of frame (e.g. High Throughput (HT) or Very High Throughput (VHT)) to facilitate delivery of frame 500. Frame Check Sequence (FCS) field 545 includes a checksum to detect corruption of frame 500.

In some embodiments, Frame Body field 540 may include sub-fields such as Probe Request field 555 and one or more Vendor IE sub-fields 560. In some embodiments, ESR related information in message(s) 430 may be included in an ESR IE in Vendor IE sub-fields 560. In some embodiments, ESR related information in message(s) 430 may be included in additional ESR IEs, which may be added to Frame Body field 540 (and/or to WiFi Direct frame 500).

In some embodiments, one or more unused or reserved bits in one or more of the fields above (e.g. Frame Control field 505) in MAC Header 550 and/or one or more new/ additional IEs may be used to indicate that ESR related information is present in frame 500. For example, Frame Control Field 505 may indicate that ESR related information is present in another IE (e.g. an ESR IE such as in a Vendor IE sub-field 560). The corresponding Vendor IE sub-field 560 may include additional information pertaining to the emergency (e.g. information included in message 430).

As described in association with FIG. 3 and FIG. 4, UE 120 and UE 125 may use an LTE Direct service to perform discovery (e.g. at stages 318 and 320 in signaling flow 300 and/or in steps 432 and 437 in signaling flow 400), to establish a secure communication session (e.g. in step 440 for signaling flow 400), to perform voice communication (e.g. in step 442 in signaling flow 400) and/or to determine or update the location of UE 120 (e.g. in step 450 of signaling flow 400). The LTE Direct service used by UEs 120 and 125 may be based on the "Proximity-based services" (ProSe) service defined by 3GPP in 3GPP TS 23.303 and TS 36.300 and may make use of open direct ProSe discovery, restricted direct ProSe discovery, EPC level ProSe discovery or some other discovery mechanism, as defined in 3GPP TS 23.303. In addition, in some embodiments, a home network for UE 120 and/or UE 125 (e.g. home network 190) and/or a serving network for UE 120 and/or UE 125 (e.g. network 150 or network 250) may provide assistance (e.g. authorization and/or control) for use of an LTE Direct service (e.g. based on 3GPP ProSe) by UE 120 and/or UE 125. For example, ProSe Function 270 and/or ProSe Application Server 272 in network 250 may provide assistance (e.g. authorization and control information) to UE 120 and/or UE 125 for use of an LTE Direct service as described in 3GPP TS 23.303. In addition, a serving or other nearby eNB (e.g. eNB 202 in network 250) may (i) indicate whether an LTE Direct service is supported (e.g. by network 250 when acting as serving network 150), (ii) provide associated control information (e.g. allowed carrier frequencies and transmission power levels), and/or (iii) provide an authorization to broadcast an ES Request (e.g. as in step 432) or send an ES Response (e.g. as in step 437) as described in 3GPP TS 36.300 entitled "Evolved Universal Terrestrial Radio Access (E-UTRA) and Evolved Universal Terrestrial Radio Access Network (E-UTRAN); Overall description; Stage 2", and 3GPP TS 36.331 entitled "Evolved Universal Terrestrial Radio Access (E-UTRA) Radio Resource Control (RRC); Protocol Specification".

In embodiments in which the LTE Direct service used by UE 120 and/or UE 125 is based on the 3GPP ProSe service, certain aspects of the 3GPP ProSe service may be enhanced, extended or modified as described in the following examples. In a first example, UE 120 and/or UE 125 may be configured to function as a ProSe-enabled Public Safety UE in which broadcast of an ES request by UE 120 (e.g. at step 432 in signaling flow 400), sending of an ES response by UE 125 (e.g. at step 437 in signaling flow 400) and/or use of a secure communication session (e.g. secure communication session 445 in signaling flow 400) uses separate public safety assigned spectrum and frequencies and may not need control or authorization from a network (e.g. network 250). In this first example, UE 120 may not normally be configured to function as a ProSe-enabled Public Safety UE but may receive configuration parameters (e.g. carrier frequency and broadcast message content) from a PSAP (e.g. from PSAP 244/248 at step 420 in signaling flow 400) that may temporarily authorize UE 120 to function as ProSe-enabled Public Safety UE. This may be of benefit when a 3GPP ProSe service is not supported, or subscribed to, by UE 120, is not supported by a serving network for UE 120 (e.g. network 250) or would take too long (e.g. more than 1 minute) to authorize and establish. In the first example, UE 125 may be permanently configured to function as a ProSe-enabled Public Safety UE in order to allow an emergency responder or other authorized responder associated with UE 125 to become aware of a distress signal from a UE 120 at any time.

In a second example of embodiments in which the LTE Direct service used by UE 120 and/or UE 125 is based on the 3GPP ProSe service, certain identifiers (IDs) and filters used for the 3GPP ProSe service may be extended to support the techniques described herein. These extensions may include: (i) assigning a new value (or new values) for a ProSe Application ID (as defined in 3GPP TS 23.303) to identify an application associated with sending or receiving an ES Request (e.g. as in step 432); (ii) assigning a value for a ProSe Application code (as defined in 3GPP TS 23.303) based on the new value for the ProSe Application ID in (i); (iii) assigning a new value (or new values) for an Application Layer User ID (as defined in 3GPP TS 23.303) to the user of UE 120 to identify the user in the context of sending an ES Request (e.g. as in step 432 in signaling flow 400); (iv) assigning a value for a Restricted ProSe Application User ID (as defined in 3GPP TS 23.303) based on the new value for the Application Layer User ID in (iii); (v) assigning a value for a ProSe Restricted Code (as defined in 3GPP TS 23.303) based on the assigned value for the Restricted ProSe Application User ID in (iv); and/or (vi) assigning a value for a ProSe Application Mask based on the assigned value for the ProSe Application code in (ii) or ProSe Restricted code in (v). The new value(s) in (i) may be configured in advance in UEs 120 and 125, the new value(s) in (iii) may be configured in advance in UE 120 and the remaining values may be assigned by a network (e.g. by a ProSe Function 270 or a ProSe Application Server (AS) 272 in a serving network 150 or home network 190) and transferred to UE 120 and/or UE 125 by messages not shown in FIG. 4. One or more of the assigned values in (ii), (iv) and (v) may then be included by UE 120 in an ES Request (e.g. in step 432) and/or one or more of the assigned values in (ii), (iv), (v) and (vi) may be used by UE 125 to detect and recognize an ES Request (e.g. in step 432) and cause UE 125 to send an ES Response (e.g. in step 437).

In embodiments for the second example in which the LTE Direct service used by UE 120 and/or UE 125 is based on the 3GPP ProSe service, certain aspects of the example signaling flow 300 may be different than as described previously in association with FIG. 3. For example, UE 120 may request authorization to broadcast the ES request (ESR) at stage 318 from a ProSe Function 270 in a home network 190 for UE 120 and may subsequently receive a response comprising the authorization to broadcast an ES request and information to include in the ES request, such as a ProSe Application Code or ProSe Restricted code, from ProSe Function 270. The request and response (not shown in FIG. 3) may be sent following detection of the emergency situation at stage 301 and prior to stage 318. In some embodiments, when UE 120 is roaming and served by a network 250 that is different to the home network 190 for UE 120 (e.g. is served by serving network 150 different to home network 190), UE 120 may send a request for authorization to broadcast the ESR at stage 318 to a ProSe Function 270 in the serving network for UE 120 (e.g. serving network 150) rather than in the home network 190, and may subsequently receive a response comprising the authorization and information to include in the ESR request from the ProSe Function 270 in this serving network. This interaction between UE 120 and a ProSe Function 270 in a serving network 250 for UE 120 may be beneficial when UE 120 is not subscribed to ProSe service with the home network 190, when there is no roaming agreement between the serving network 250 and the home network 190 for support of ProSe service or when interaction with a ProSe Function 270 in the home network 190 would add significant extra delay compared to UE 120 interaction with a ProSe Function 270 in the serving network 250. Similar to UE 120, UE 125 may request authorization to monitor for (e.g. listen for) the ESR at stage 318 and assist discovery of UE 125 at stage 320 from a ProSe Function 270 in a home network for UE 125 and may subsequently receive a response comprising the authorization and information to recognize the ESR request, such as a ProSe Application Code, ProSe Restricted code or ProSe Application Mask, from the ProSe Function 270. The request and response (not shown in FIG. 3) may be sent whenever UE 125 attaches to a new network (e.g. network 250) and/or at other times. In some embodiments, when UE 125 is roaming and is served by a network 250 that is different to the home network for UE 125 (e.g. is served by serving network 150), UE 125 may send a request for authorization to monitor for the ESR at stage 318 and assist discovery of UE 125 at stage 320 to a ProSe Function 270 in the serving network for UE 125 (e.g. serving network 150) rather than in the home network for UE 125 and may subsequently receive a response comprising the authorization and information to recognize the ESR request from the ProSe Function 270 in this serving network. This interaction between UE 125 and a ProSe Function 270 in a serving network 250 for UE 125 may be beneficial for the same or similar reasons to those described previously in relation to UE 120 accessing a ProSe Function 270 in a serving network for UE 120.

In embodiments for the second example in which the LTE Direct service used by UE 120 and/or UE 125 is based on the 3GPP ProSe service, certain aspects of the example signaling flow 400 may also be different than as described previously. For example, step 420 may not occur and instead, UE 120 may interact with a ProSe Function 270 in a home network 190 or serving network 250 to enable UE 120 to obtain an authorization to broadcast an ESR request in step 432 and obtain information to include in the ESR request, such as a ProSe Application Code or ProSe Restricted code as described previously for the second example. In these embodiments, the token included in the message 430 (e.g. an ES request) may comprise a ProSe Application Code or ProSe Restricted code received from the ProSe Function 270. In addition or instead, one or more of steps 422, 425, 452, and 480 may not occur and instead, UE 125 may interact with a ProSe Function 270 in a home network for UE 125 or as serving network 250 for UE 125 to obtain an authorization to monitor for the ESR request in step 432 and obtain information to recognize the ESR request, such as a ProSe Application Code, ProSe Restricted code or ProSe Application Mask as described previously for the second example.

Figure 6A:
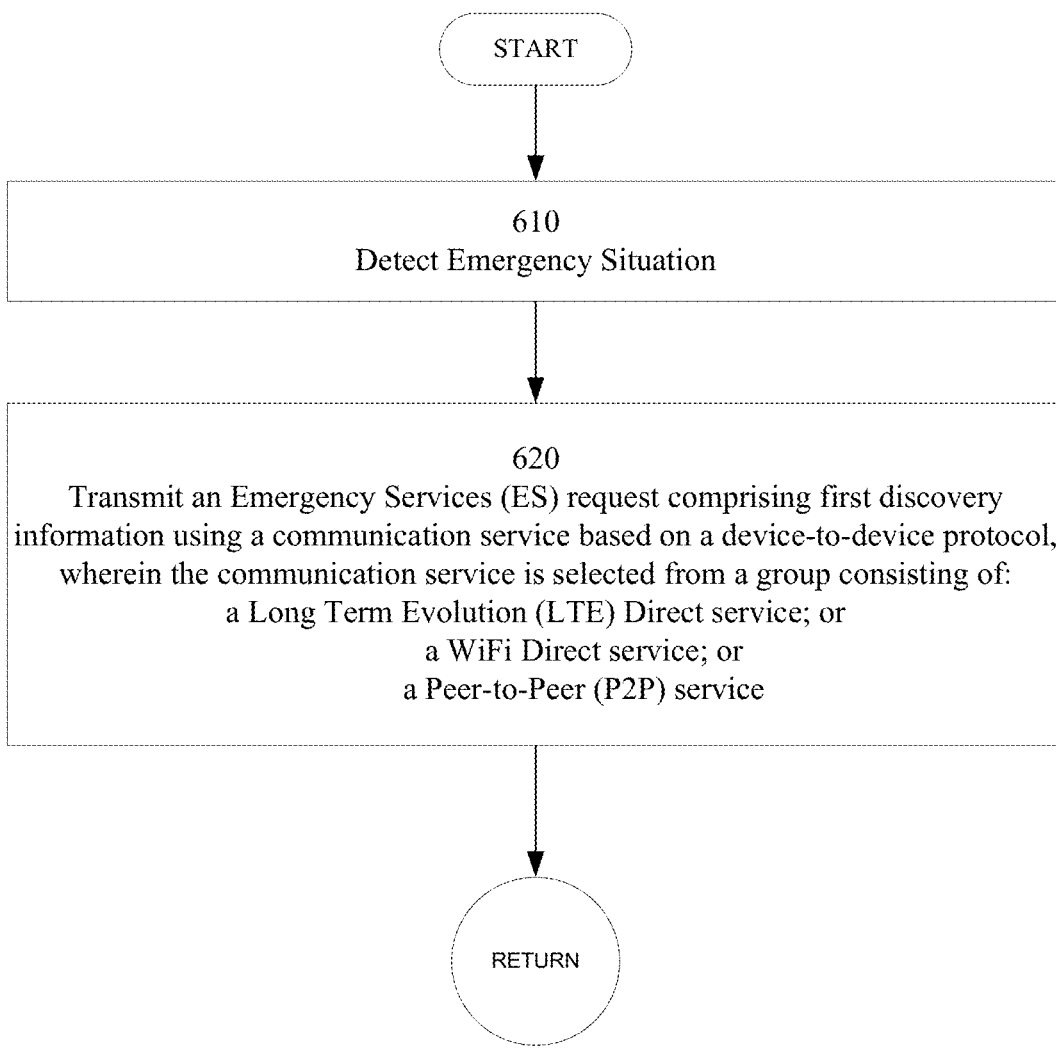
FIGS. 6A, 6B and 7 show flowcharts for exemplary methods for assisting an emergency situation at a wireless device.

FIG. 6A shows a flowchart for an exemplary method 600 for assisting an emergency situation at a first UE. In some embodiments, method 600 may be performed by a UE 120 and/or processor(s) on a first UE such as UE 120. In some embodiments, method 600 may be performed using an application on the first UE (e.g. an ESR application).

In block 610, an emergency situation may be detected. The emergency situation may be detected automatically by the first UE and/or by sensors and/or an emergency detection system communicatively coupled to the first UE. For example, detection of an emergency situation may occur when a smoke detector or carbon monoxide detector is triggered. As another example, detection of an emergency situation may occur when a medical device (e.g. an implanted, wearable, or user-coupled device monitoring a medical condition) comprised in the first UE or communicatively coupled to the first UE detects an abnormality indicating an emergency. In some instances, the detection may also occur based on user input. As an example, a user may indicate detection of an emergency situation by placing an ES call, or by invoking an ES related application on the first UE.

In block 620, an ES Request (ESR) may be transmitted. In some embodiments, the ESR may comprise first discovery information (e.g. for UE 120). Further, the ESR may be transmitted by broadcasting the ESR using a communication service based on a device-to-device protocol, wherein the communication service is selected from a group consisting of: a Long Term Evolution (LTE) Direct service; or a WiFi Direct service; or a Peer-to-Peer (P2P) service.

As one example, when using a WiFi Direct service, the ESR may be broadcast using one or more IEs in frame 500 (e.g. Frame Control 505 in frame 500 may provide an indication that the request is an ESR) and may include first discovery information (e.g. Address 2 520 and/or Address 3 535 in frame 500) for the first UE. As another example, when using an LTE Direct service, the first UE or an application on the first UE may be configured to automatically initiate LTE Direct ESR expression broadcasts, which may include first discovery information for the first UE (e.g. UE 120). The LTE Direct ESR may include a code, which may comprise first discovery information to communicate with UE 120.

In some embodiments, the ESR may be broadcast on one or more available channels or frequencies (e.g. 2 GHz and/or 5 GHz). In some embodiments, one or more other resources utilized may be relinquished (e.g. other non-ES related calls, data exchanges, etc. may be terminated or suspended). In some embodiments, based on available battery capacity and/or the nature of the emergency, the ESR broadcast may occur at an elevated strength level (e.g. to increase broadcast ESR signal range).

In some embodiments, the method may further comprise receiving a response to the ESR from one or more second UEs (e.g. one or more responder UEs 125), where the response may comprise second discovery information, wherein the one or more second UEs are distinct from the first UE.

In some embodiments, the ESR may further comprise an ES indication. The ES indication may provide further information about the emergency such as an emergency identifier and type of emergency. For example, for WiFi Direct, the ES indication may be included in one or more IEs in frame 500 (e.g. Vendor IEs 560). For example, for LTE Direct, the ES indication may comprise an ESR expression which may include metadata or information elements pertaining to the emergency such as a ProSe Application Code or ProSe Restricted code in some embodiments.

In some embodiments, the response to the ESR may be received using the communication service, and the method may comprise establishing a first secure communication session between the first UE and the one or more second UEs based on the first discovery information and/or the second discovery information. The secure communication session may be established using the communication service. In some embodiments, at least one of the broadcast of the ESR or the response to the ESR may be encrypted.

In some embodiments, the broadcast of the ESR, the response to the ESR, and the establishment of the first secure communication session may occur through an application supporting emergency services on the first UE (e.g. UE 120 broadcasting the ESR). For example, a first application on the first UE may be configured to initiate the WiFi Direct and/or LTE Direct and/or P2P ESR broadcasts, receive the response, and then establish the first secure communication session with the second UE (e.g. a responding UE 125) based on the first discovery information (e.g. for UE 120) and/or the second discovery information (e.g. for UE 125).

Conversely, a second application on a second responding UE (e.g. UE 125) may receive the ESR (e.g. from UE 120 broadcasting the ESR) using the WiFi Direct and/or LTE Direct and/or P2P ESR broadcasts, send a response comprising the second discovery information, and then use the first discovery information (e.g. for UE 120) and/or the second discovery information (e.g. for UE 125) to establish the secure communication session.

As one example, the first application may be provided to all users (e.g. to enable transmission of ESRs), while the second application may be provided only to authorized responders. In some embodiments, ESR broadcasts from a first UE (e.g. UE 120 broadcasting the ESR) may be received by any second UE in the vicinity of the first UE (e.g. using a third application) but only authorized responders may be provided with the second application. For example, an LTE Direct public expression (or a 3GPP ProSe Application Code) signifying a fire related emergency by a first UE (e.g. UE 120) may be received by all UEs (e.g. via the third application) in the vicinity of the first UE but only UEs of authorized responders (e.g. UEs 125) may be provided with the second application to respond to the ESR broadcast.

In some embodiments, the first secure communication session may support multimedia communications. For example, the first application (e.g. on UE 120 broadcasting the ESR) and the second application (e.g. on UE 125 responding to the ESR) may be able to communicate via video, voice, text, instant messaging etc. In some embodiments, the first secure communication session may comprise a voice session.

In some embodiments, the method may further comprise enabling the one or more second UEs (e.g. responder UEs 125) to obtain a location of the first UE (e.g. UE 120 broadcasting the ESR), where the location may be obtained based at least in part on the first secure communication session. For example, one or more second UEs (e.g. UEs 125) may be able to obtain the location of the first UE (e.g. UE 120) when the first UE (e.g. UE 120) enables: measurement of a range (or RTT) between the first UE and at least one of the one or more second UEs, or measurement of an angle or arrival of a signal from the first UE to at least one of the one or more second UEs, or both. In some embodiments, the location determination may occur using IEEE 802.11 Fine Time Measurement (FTM) and/or other standardized WiFi Direct and/or LTE Direct frame exchanges.

In some embodiments, the method may further comprise: sending a first message to a Public Safety Answering Point (PSAP) requesting the establishment of a second communication session with the PSAP; and receiving from the PSAP a second message comprising a token, wherein the first discovery information comprises at least part of the token. The second communication session may be an emergency services (ES) session (e.g. ES session 410 for signaling flow 400) and may be established after detecting an emergency situation at block 610 and before, after or at the same time as sending the ES request at block 620. The token received in the second message may comprise an identity or identifier for the first UE 120 such as a temporary and/or unique identifier for the first UE (e.g. UE 120) assigned by the PSAP (e.g. PSAP 244/248) that can be recognized by the second UE (e.g. UE 125). Alternatively, or additionally, the token may include a non-unique indication of an emergency situation that can be recognized by the second UE. In some embodiments, the method may further comprise establishing the second communication session with the PSAP.

In some embodiments, the first message and the second message may be messages for the Session Initiation Protocol (SIP). For example, the first message may be a SIP INVITE message and the second message may be a SIP INFO, SIP UPDATE or SIP 200 OK message.

Figure 6B:
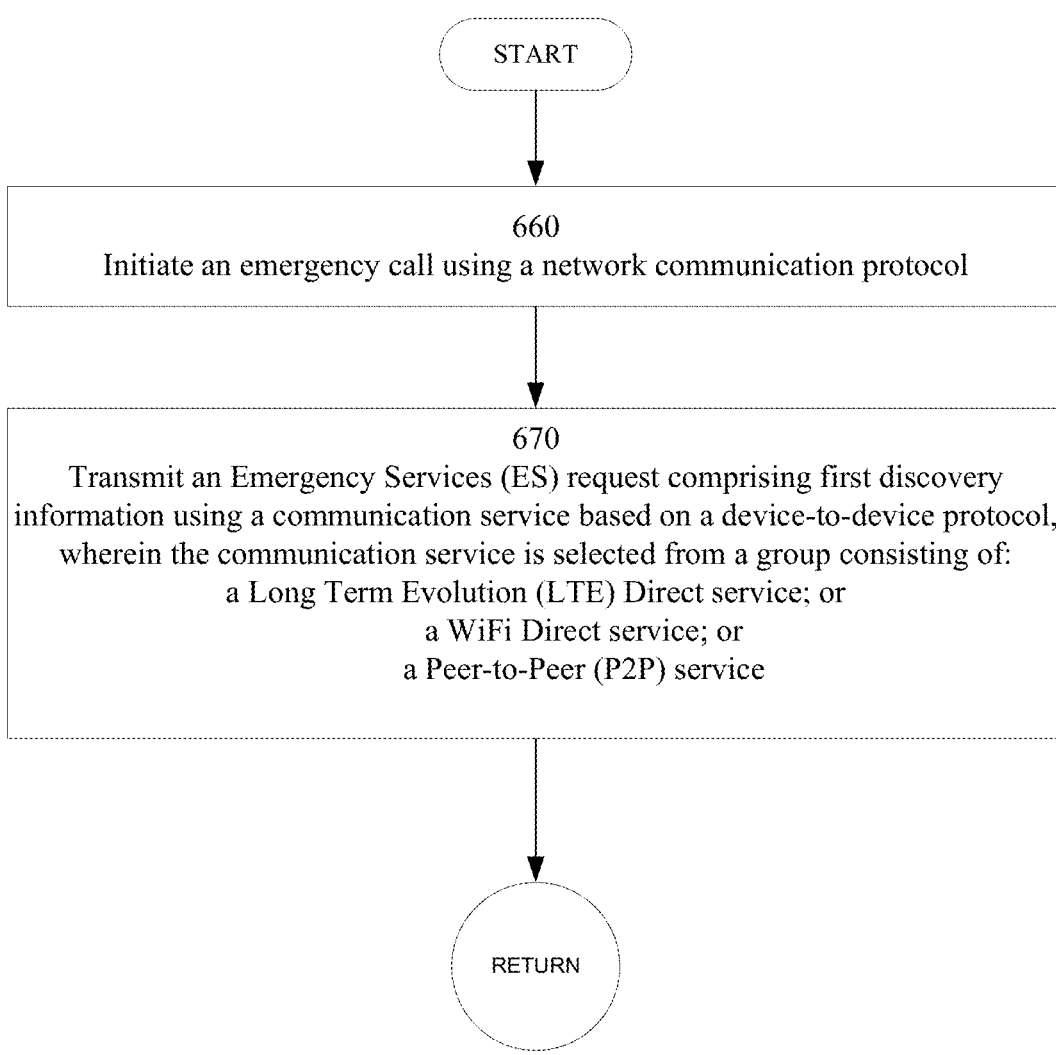

FIG. 6B shows a flowchart for an exemplary method 650 for assisting an emergency situation at a first UE. In some embodiments, method 650 may be performed by a UE 120 and/or processor(s) on UE 120. In some embodiments, method 600 may be performed using an application on UE 120 (e.g. an ESR application).

In block 660, an emergency call using a network communication protocol may be initiated. For example, an emergency situation may be detected and, the emergency call may be initiated in response to detection of the emergency situation. In some embodiments, detection of the emergency and initiation of the emergency call may be performed automatically. For example, the emergency call may be initiated automatically by the first UE (e.g. UE 120), or by an emergency detection system that is communicatively coupled to the first UE. As one example, detection of an emergency situation may occur when a smoke detector or carbon monoxide detector is triggered. As another example, detection of an emergency situation may occur when a medical device (e.g. an implanted, wearable, or user-coupled device monitoring a medical condition) comprised in the first UE (e.g. UE 120) or communicatively coupled to the first UE detects an abnormality indicating an emergency, which may result in the first UE (or an application on the first UE) initiating an emergency call. In some instances, the initiation of the emergency call and/or detection of the emergency may also occur based on user input. The emergency call may be initiated using any available network communication protocol (e.g. the SIP protocol). As a further example, a user may indicate detection of an emergency situation by placing an ES call, or by invoking an ES related application on the first UE. In some embodiments, the ES request may further comprise an emergency indication.

In block 670, an ES Request (ESR) may be transmitted. In some embodiments, the ESR may comprise first discovery information (e.g. for UE 120). Further, the ESR may be transmitted using a communication service based on a device-to-device protocol, wherein the communication service is selected from one of: a Long Term Evolution (LTE) Direct service; or a WiFi Direct service; or a Peer-to-Peer (P2P) service.

As one example, when using a WiFi Direct service, the ESR may be broadcast using one or more IEs in frame 500 (e.g. Frame Control 505 in frame 500 may provide an indication that the request is an ESR) and may include first discovery information (e.g. Address 2 520 and/or Address 3 535 in frame 500) for the first UE.

As another example, when using an LTE Direct service, the first UE or an application on the first UE may be configured to automatically initiate LTE Direct ESR expression broadcasts, which may include first discovery information for the first UE. The LTE Direct ESR may include a code, which may comprise first discovery information to communicate with the first UE. In some embodiments, the communication service may be the LTE-Direct service and wherein transmitting the ES request using the device-to-device communication service may comprise transmitting an LTE Direct private expression or a 3GPP ProSe Restricted Code indicative of the ES request. In instances, where communication was not successfully established upon initiation of the emergency call, transmitting the ES request using the device-to-device communication service may comprise broadcasting an LTE Direct public expression or a 3GPP ProSe Application Code indicative of the ES request.

In some embodiments, the ESR may be broadcast on one or more available channels or frequencies (e.g. 2 GHz and/or 5 GHz). In some embodiments, one or more other resources utilized may be relinquished (e.g. other non-ES related calls, data exchanges, etc. may be terminated or suspended). In some embodiments, based on available battery capacity and/or the nature of the emergency, the ESR broadcast may occur at an elevated strength level (e.g. the power can be elevated to increase broadcast ESR signal range).

In some embodiments, the method may further comprise receiving a response to the ESR from one or more second UEs (e.g. one or more responder UEs 125), where the response may comprise second discovery information, wherein the one or more second UEs are distinct from the first UE.

In some embodiments, the ESR may further comprise an ES indication. The ES indication may provide further information about the emergency such as an emergency identifier and type of emergency. For example, for WiFi Direct, the ES indication may be included in one or more IEs in frame 500 (e.g. Vendor IEs 560). For example, for LTE Direct, the ES indication may comprise an ESR expression which may include metadata or information elements pertaining to the emergency such as a ProSe Application Code or ProSe Restricted Code in some embodiments.

In some embodiments, the response to the ESR may be received using the communication service used to transmit the ESR, and the method may comprise establishing a first secure communication session between the first UE and the one or more second UEs based on the first discovery information and/or the second discovery information. The secure communication session may be established using the communication service. In some embodiments, at least one of the broadcast of the ESR or the response to the ESR may be encrypted.

In some embodiments, the broadcast of the ESR, the response to the ESR, and the establishment of the first secure communication session may occur through an application supporting emergency services on the first UE (e.g. UE 120 broadcasting the ESR). For example, a first application on the first UE may be configured to initiate the WiFi Direct and/or LTE Direct and/or P2P ESR broadcasts, receive the response, and then establish the first secure communication session with the second UE (e.g. a responding UE 125) based on the first discovery information (e.g. for UE 120) and/or the second discovery information (e.g. for UE 125).

Conversely, a second application on responding UE 125 may receive the ESR (e.g. from UE 120 broadcasting the ESR) using the WiFi Direct and/or LTE Direct and/or P2P ESR broadcasts, send a response comprising the second discovery information, and then use the first discovery information (e.g. for UE 120) and/or the second discovery information (e.g. for UE 125) to establish the secure communication session.

As one example, the first application may be provided to all users (e.g. to enable transmission of ESRs), while the second application may be provided only to authorized responders. In some embodiments, ESR broadcasts from a first UE (e.g. UE 120 broadcasting the ESR) may be received by any second UE in the vicinity of the first UE (e.g. using a third application) but only authorized responders may be provided with the second application. For example, an LTE Direct public expression of a fire related emergency by a first UE (e.g. UE 120) may be received by all UEs (e.g. via the third application) in the vicinity of the first UE but only UEs of authorized responders (e.g. UEs 125) may be provided with the second application to respond to the ESR broadcast.

In some embodiments, the first secure communication session may support multimedia communications. For example, the first application (e.g. on UE 120 broadcasting the ESR) and the second application (e.g. on UE 125 responding to the ESR) may be able to communicate via video, voice, text, instant messaging etc. In some embodiments, the first secure communication session may comprise a voice session.

In some embodiments, upon receiving a response to the ESR, the method may further comprise receiving, at the first UE (e.g. UE 120) from the second UE (e.g. UE 125), location information indicative of a location of the first UE or the second UE. In some embodiments, the location information related to the location of the first UE may comprise: information indicative of a range between the first UE and the second UE, or information indicative of a measurement of an angle of arrival of a signal from the first UE at the second UE, or both.

For example, the first UE (e.g. UE 120) may enable one or more second UEs (e.g. responder UEs 125) to obtain a location of the first UE (e.g. UE 120 broadcasting the ESR), where the location may be obtained based at least in part on the first secure communication session. For example, one or more second UEs (e.g. UEs 125) may be able to obtain the location of the first UE (e.g. UE 120) when the first UE (e.g. UE 120) enables: measurement of a range (or RTT) between the first UE and at least one of the one or more second UEs, or measurement of an angle or arrival of a signal from the first UE to at least one of the one or more second UEs, or both. In some embodiments, the location determination may occur using IEEE 802.11 Fine Time Measurement (FTM) and/or other standardized WiFi Direct and/or LTE Direct signal exchanges.

In some embodiments, initiating the emergency call using the network communication protocol at block 660 may comprise: sending a first message to a Public Safety Answering Point (PSAP) requesting establishment of a second communication session with the PSAP; and receiving from the PSAP, a second message comprising a token, wherein the first discovery information comprises at least part of the token. The second communication session may be an emergency services (ES) session (e.g. ES session 410 for signaling flow 400) and may be established before, after or at the same time as sending the ES request at block 670. The token received in the second message may comprise an identity or identifier for the first UE such as a temporary and/or unique identifier for the first UE (e.g. UE 120) assigned by the PSAP (e.g. PSAP 244/248) that can be recognized by the second UE (e.g. UE 125). Alternatively, or additionally, the token may include a non-unique indication of an emergency situation that can be recognized by the second UE. In some embodiments, the method may further comprise establishing the second communication session with the PSAP.

In some embodiments, the first message and the second message may be messages for the Session Initiation Protocol (SIP). For example, the first message may be a SIP INVITE message and the second message may be a SIP INFO, SIP UPDATE or SIP 200 OK message.

Figure 7:
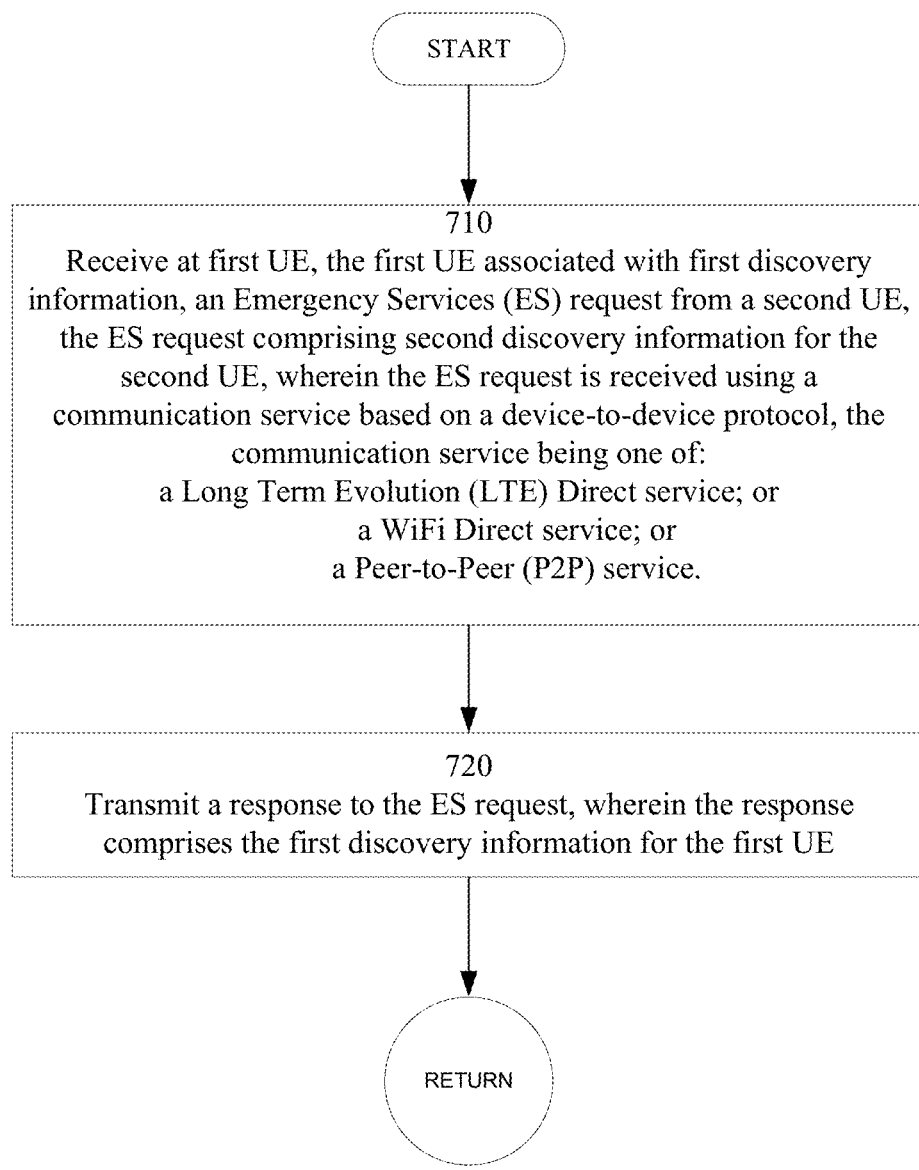

FIG. 7 shows a flowchart for an exemplary method 700 for assisting an emergency situation at a second User Equipment (UE) (e.g. a UE 120 requesting ES). Method 700 may be performed by a first UE (e.g. a UE 125 responding to an ESR from UE 120). In some embodiments, method 700 may be performed by UE 125 and/or processor(s) on UE 125. In some embodiments, method 700 may be performed using an application on UE 125 (e.g. an ES response application). In some embodiments, a first discovery information may be associated with the first UE (e.g. UE 125).

In block 710, an ESR comprising second discovery information for the second UE (e.g. UE 120) may be received by the first UE (e.g. by UE 125) wherein the ESR is received using a communication service comprising: a Long Term Evolution (LTE) Direct service; or a WiFi Direct service; or a Peer-to-Peer (P2P) service. In some embodiments, the ESR may further comprise an emergency indication.

As one example, when using a WiFi Direct service, the ESR may be received and identified using one or more IEs in frame 500 (e.g. Frame Control 505 in frame 500 received by UE 125 may provide an indication that the request is an ESR), and may include second discovery information (e.g. Address 2 520 and/or Address 3 525 in frame 500 received by UE 125) for UE 120. As another example, when using an LTE Direct service, UE 125 or an application on UE 125 may be configured to automatically filter (e.g. using a ProSe Application Mask) received LTE expression broadcasts to identify LTE Direct ESR expression broadcasts, which may include second discovery information for UE 120. The LTE Direct ESR may include a code, which may comprise second discovery information to communicate with UE 120. In some embodiments, one more available channels or frequencies (e.g. 2 GHz and/or 5 GHz) may be monitored by the first UE (e.g. UE 125) to detect and receive the ESR broadcasts.

In block 720, the first UE transmits a response to the ES request, where the response comprises first discovery information for the first UE.

As an example, when using a WiFi Direct service, a response to the ESR may be sent using one or more IEs in frame 500 (e.g. Frame Control 505 in frame 500 sent by UE 125 may provide an indication that the request is an ES response), and may include first discovery information (e.g. Address 2 520 and/or Address 3 525 in frame 500 sent by UE 125) for UE 125. As a further example, when using an LTE Direct service, UE 125 or an application on UE 125 may be configured to respond to LTE ESR expression broadcasts with an LTE Direct ES response comprising first discovery information (to facilitate communication with UE 125). For LTE Direct the response may be directly sent between the devices or be network assisted.

In some embodiments, the response to the ES request may be transmitted using the communication service. The method may further comprise establishing a first secure communication session between the first UE and the second UE based on the first discovery information and/or the second discovery information. The first secure communication session may be established using the communication service. In some embodiments, the received ES request and/or the response to the ES request may be encrypted.

In some embodiments, the received ES request, the response to the ES request, and the establishment of the first secure communication session may occur through an application supporting emergency services communication on the first UE (e.g. UE 125 responding to the ESR). For example, a first application on the first UE (e.g. responding UE 125) may receive the ESR (e.g. from UE 120 broadcasting the ESR) using the WiFi Direct and/or LTE Direct and/or P2P ESR broadcast, send the response, and then use the second discovery information (e.g. for UE 120) and/or the first discovery information (e.g. for UE 125) to establish the secure communication session.

Conversely, a second application on UE 120 may be configured to initiate the WiFi Direct and/or LTE Direct and/or P2P ESR broadcast, receive the response, and then establish the first secure communication session with the first UE (e.g. a responding UE 125) using WiFi Direct and/or LTE Direct and/or the P2P service based on the first discovery information (e.g. for UE 125).

As one example, the second application may be provided to all users (e.g. to enable emergency reporting), while the first application may be provided only to authorized responders. In some embodiments, ESR broadcasts from a second UE (e.g. UE 120 broadcasting the ESR) may be received by any first UE in the vicinity of the second UE (e.g. using a third application) but only authorized responders (e.g. associated with the first UE) may be provided with the first application. For example, an LTE Direct public expression of a fire related emergency by a second UE (e.g. UE 120) may be received by all UEs (e.g. via a third application) in the vicinity of the second UE but only UEs of authorized responders (e.g. UEs 125) may be provided with the first application to respond to the ESR broadcast.

In some embodiments, the first secure communication session may support multimedia communications. For example, the second application (e.g. on UE 120 broadcasting the ESR) and the first application (e.g. on UE 125 responding to the ESR) may be able to communicate via video, voice, text, instant messaging etc. In some embodiments, the first secure communication session may comprise a voice session.

In some embodiments, the method may further comprise: determining, based on the first secure communication session, a location of the second UE (e.g. UE 120). In some embodiments, a location of the second UE may be determined by measuring a range (or RTT) between the first UE and the second UE, measuring an angle or arrival of a signal from the second UE to the first UE or measuring both. In some embodiments, the location determination may occur using IEEE 802.11 FTM and/or other standardized WiFi Direct and/or LTE Direct frame exchanges. In some embodiments, the method may comprise: sending information to the second UE indicative of a location of the second UE, or the first UE, or both UEs.

In some embodiments, the method may further comprise: sending a first message to a Public Safety Answering Point (PSAP) requesting establishment of a second secure communication session with the PSAP; and receiving from the PSAP a second message comprising a token, wherein the second discovery information comprises at least part of the token. In some embodiments, the method may further comprise establishing the second secure communication session with the PSAP. In some embodiments, the first message and the second message may be messages for the Session Initiation Protocol (SIP). For example, the first message may be a SIP INVITE message and the second message may be a SIP INFO, SIP UPDATE or SIP 200 OK message.

Figure 8:
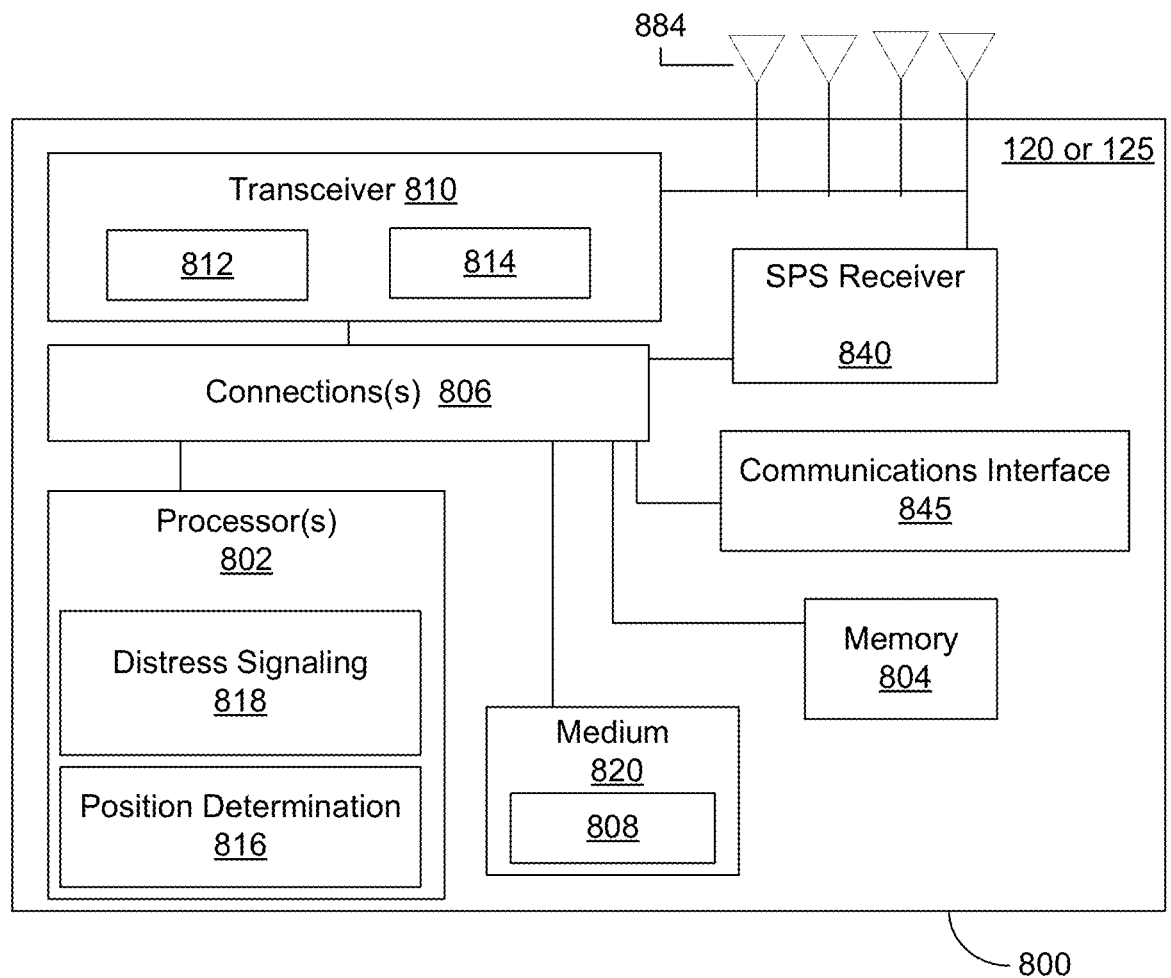
FIG. 8 shows a schematic block diagram illustrating certain exemplary features of a wireless device enabled to support distress signaling.

FIG. 8 shows a schematic block diagram illustrating certain exemplary features of a UE 800 enabled to support distress signaling according to techniques described herein. UE 800 may correspond to either or both of UE 120 and UE 125.

In FIG. 8, when requesting ES, the UE 800 may perform functions associated with UE 120. For example, when requesting ES, UE 800 may perform method 600 and perform functions of UE 120 as described in FIGS. 1-6. Accordingly, when requesting ES, UE 800 may be configured with an application to request ES as outlined, for example, in FIG. 6.

In FIG. 8, when responding to an ESR, UE 800 may perform functions associated with UE 125. For example, when responding to an ESR, UE 800 may perform method 700 and perform functions of UE 125 as described in FIGS. 1, 4, 5 and 7. Accordingly, when responding to an ESR, UE 800 may be configured with an application to respond to an ESR as outlined, for example, in relation to FIG. 7.

In some embodiments, UE 800 may be configured to communicate with one or more of the entities shown in FIGS. 2, 3, and 4 (as appropriate).

In some embodiments, UE 800 may, for example, include one or more processor(s) 802, memory 804, a transceiver 810 (e.g., a wireless network interface), and (as applicable) an SPS receiver 840, which may be operatively coupled with one or more connections 806 (e.g., buses, lines, fibers, links, etc.) to non-transitory computer-readable medium 820 and memory 804. In certain example implementations, all or part of UE 800 may take the form of a chipset, and/or the like.

The SPS receiver 840 may be enabled to receive signals associated with one or more SPS resources such as one or more Earth orbiting Space Vehicles (SVs) 180, which may be part of a satellite positioning system (SPS). In some embodiments, UE 800 (e.g. SPS receiver 840 and/or processor(s) 802) may process SPS signals to determine the location of UE 800. SVs 180, for example, may be in a constellation of Global Navigation Satellite System (GNSS) such as the US Global Positioning System (GPS), the European Galileo system, the Russian Glonass system or the Chinese Beidou system. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems.

By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Transceiver 810 may, for example, include a transmitter 812 enabled to transmit one or more signals over one or more types of wireless communication interfaces and a receiver 814 to receive one or more signals transmitted (e.g. by network base stations and/or access points) over the one or more types of wireless communication interfaces. For example, transceiver 810 may transmit and receive WWAN (e.g. LTE) signals and/or WLAN signals (e.g. based on IEEE 802.11x, such as 802.11ac based signals). In some embodiments, transceiver 810 may also transmit and receive LTE Direct, WiFi Direct and/or other P2P signals. LTE Direct and/or WiFi Direct may facilitate direct communication with another UE (e.g. another instance of UE 800).

Processor(s) 802 may be implemented using a combination of hardware, firmware, and software. In some embodiments, processor(s) 802 may represent one or more circuits configurable to perform at least a portion of a computing procedure or process related to the operation of UE 120/125. In some embodiments, processor(s) 802 may include (e.g. may be configured to execute program instructions from memory 804 for) a Position Determination Component (PDC) 816, which may process signal measurements (e.g. SPS signal measurements, radio location related measurement such as OTDOA, RSSI, RTT etc.) to determine a location of UE 800.

In some embodiments, processor(s) 802/PDC 816 may use signal measurements (e.g. RTT, AoA, and/or AoD) obtained from LTE Direct and/or WiFi Direct signals received from another UE (e.g. another instance of UE 800) to determine the location of UE 800 and/or the location of the other UE (e.g. determining a location of UE 120 when responding to an ESR).

Processor(s) 802 may also include (e.g. may be configured to execute program instructions from memory 804 for) a Distress Signaling Component (DSC) 818, which may process distress signals in accordance with disclosed embodiments. For example, when functioning in an emergency response mode (e.g. as UE 125—when used by emergency responders), processor(s) 802/DSC 818 may perform a portion of the procedure shown in FIG. 4 (e.g. for UE 125) and/or method 700. When functioning in an emergency response mode, processor(s) 802/DSC 818 may process emergency related information (e.g. a token, identifier and additional information) received from a PSAP (e.g. PSAP 244 or 248) related to a UE (e.g. UE 120) signaling distress, and monitor transmissions (e.g. LTE Direct, WiFi Direct, P2P) on one or more available channels or frequencies for transmissions related to the emergency. For example, processor(s) 802/DSC 818 may monitor transmissions using transceiver 810. In some embodiments, processor(s) 802/DSC 818 may process a received ESR to establish secure communication sessions with a UE broadcasting the ESR (e.g. UE 120). In some embodiments, processor(s) 802/DSC 818 may provide signal measurements to PDC 816 to determine the location of the UE 800 and/or to determine the location of another communicatively coupled UE (e.g. a UE 120).

As another example, when functioning to signal distress (e.g. as UE 120), processor(s) 802/DSC 818 may initiate an ES call to a PSAP (e.g. PSAP 244 or 249), broadcast the ESR, communicate with the PSAP, and perform a portion of the procedures shown in FIGS. 3 and 4 (e.g. for UE 120) and/or method 600. When functioning in an emergency signaling mode (as UE 120), processor(s) 802/DSC 818 may process emergency related information (e.g. token and additional information) received from a PSAP (e.g. PSAP 244 or 248) and then transmit some or all of the emergency related information including the token or part of the token, location information and/or additional information (e.g. using LTE Direct, WiFi Direct, P2P). For example, processor(s) 802/DSC 818 may transmit using transceiver 810. In some embodiments, processor(s) 802/DSC 818 may process responses to the transmitted ESR to establish secure communication sessions with valid authorized responding UEs (e.g. UEs 125). In some embodiments, processor(s) 802/DSC 818 may provide signal measurements to PDC 816 to determine the location of the UE 800 and/or to facilitate determination of the location of UE 800 by another communicatively coupled UE (e.g. UE 125).

In some embodiments, UE 800 may include one or more antennas 884, which may be internal or external. Antennas 884 may be used to transmit and/or receive signals processed by transceiver 810 and/or SPS receiver 840. In some embodiments, antennas 884 may be coupled to transceiver 810 and SPS receiver 840. Antennas 884 may be used in conjunction with transceiver 810 to facilitate Multiple In Multiple Out (MIMO) communication, including Multi-User MIMO (MU-MIMO) communication. In some embodiments, measurements of signals transmitted and/or received by antennas 884 may be used to determine AoA, AoD, RTT and/or other signal parameters.

The methodologies described herein may be implemented by various means depending upon the application. For example, these methodologies may be implemented in hardware, firmware, software, or any combination thereof. For a hardware implementation, the processor(s) 802, PDC 816 and/or DSC 818 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies described herein may be implemented with microcode, procedures, functions, and so on that perform the functions described herein. Any machine-readable medium tangibly embodying instructions may be used in implementing the methodologies described herein. For example, software code may be stored in a non-transitory computer-readable medium 820 or memory 804 that is coupled to and executed by processor(s) 802. Memory may be implemented within the processor(s) 802 and/or may be external to the processor(s) 802. As used herein the term "memory" refers to any type of long term, short term, volatile, nonvolatile, or other memory and is not to be limited to any particular type of memory or number of memories, or type of media upon which memory is stored.

If implemented in firmware and/or software, the methodologies and functions described herein may also be stored as one or more instructions or program code 808 on a non-transitory computer-readable medium, such as medium 820 and/or memory 804. Examples include computer-readable media encoded with a data structure and computer-readable media encoded with a computer program 808. For example, the non-transitory computer-readable medium including program code 808 stored thereon may include program code 808 to support location determination, distress signaling, various communication protocols, including emergency communication (e.g. E911) related protocols.

Non-transitory computer-readable medium 820 includes physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code 808 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Memory 804 may represent any data storage mechanism. Memory 804 may include, for example, a primary memory and/or a secondary memory. Primary memory may include, for example, a random access memory, read only memory, etc. While illustrated in this example as being separate from processor(s) 802, it should be understood that all or part of a primary memory may be provided within or otherwise co-located/coupled with processor(s) 802. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 820. As such, in certain example implementations, the methods and/or apparatuses presented herein may take the form in whole or part of a computer-readable medium 820 that may include computer implementable instructions 808 stored thereon, which if executed by at least one processor(s) 802 may be operatively enabled to perform all or portions of the example operations as described herein. Computer readable medium 820 may be a part of memory 804.

Figure 9:
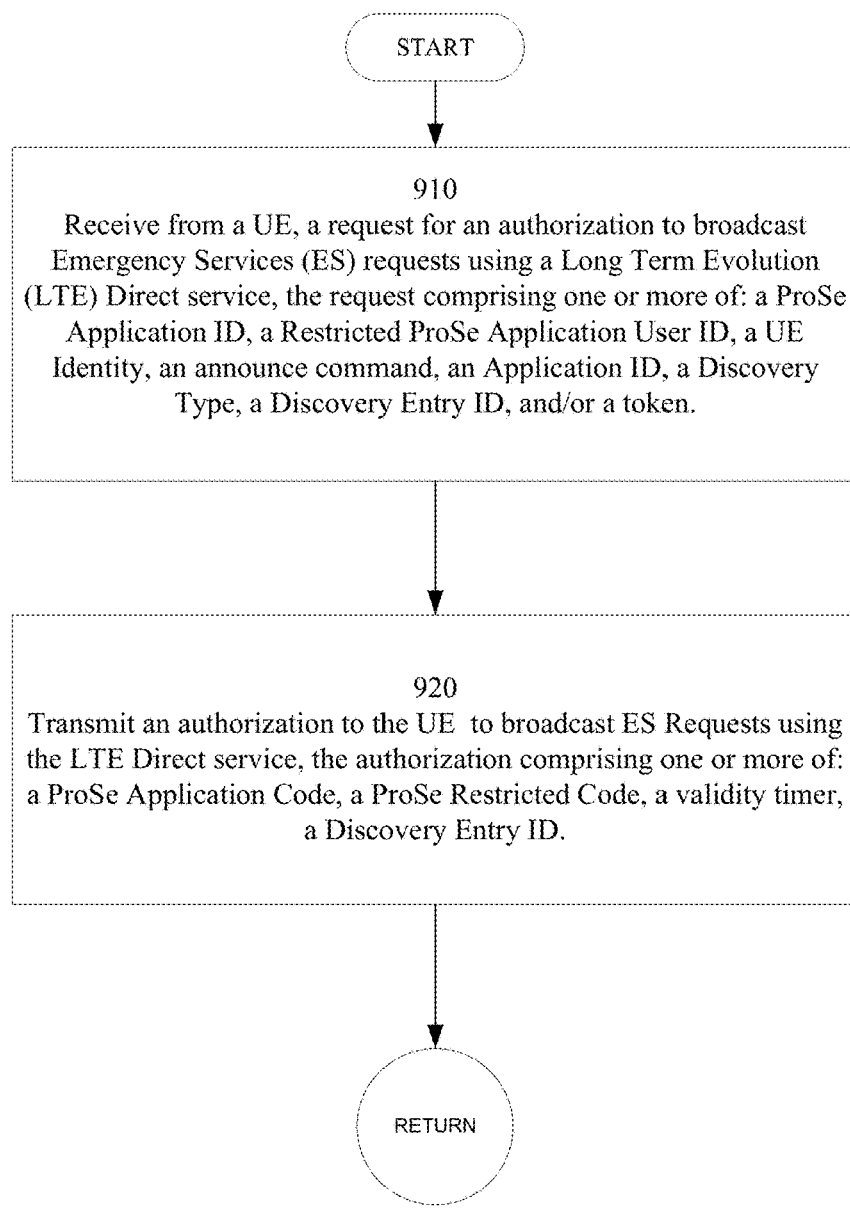
FIG. 9 shows a flowchart of an exemplary method for facilitating LTE Direct ES communication.

FIG. 9 shows an exemplary method 900 for facilitating LTE Direct ES communication by a server. In some embodiments, method 900 may be performed by a server comprising: ProSe Function 270, and/or a ProSe AS 272, and/or an ENS communicatively coupled to a UE (e.g. UE 120). A server that comprises a ProSe Function 270 and/or ProSe AS 272 may be associated with (e.g. may be part of) the serving network for UE 120 (e.g. serving network 150) or the home network for UE 120 (e.g. home network 190).

In some embodiments, in block 910, a request (e.g. ProSe Discovery Request) for authorization to broadcast ES requests using an LTE Direct service may be received from a UE (e.g. UE 120). For example, the server (e.g. ProSe Function 270) may receive a request for an authorization to broadcast ES requests using LTE Direct from UE 120 (e.g. after UE 120 detects an emergency situation).

In some embodiments, the request received in block 910 (e.g. from UE 120) may include one or more parameters including: a ProSe Application ID, a Restricted ProSe Application User ID, a UE Identity, an announce command, an Application ID, a Discovery Type, a Discovery Entry ID, and/or a token. The UE Identity may be a global identity for the UE (e.g. an IMSI). The Application ID may (i) indicate an application in the UE, wherein the application triggered or sent the request received at block 910, and/or (ii) identify an emergency services related application. The ProSe Application ID may indicate or identify the ES request or the type of ES request for which authorization is requested (e.g. may indicate or identify a type of emergency situation or a type of ES distress signal). The Restricted ProSe Application User ID may identify, in a secure manner, the user of the UE in association with an ES application and may be included as an alternative to a ProSe Application ID. The Discovery Type may, when included, indicate secure discovery, also referred to as restricted discovery. The Discovery Entry ID may indicate whether this is a new request. The token may comprise certain information to be included in the ES request. In some embodiments, one or more of the parameters in the request received at block 910 may have been received by the UE from a ProSe AS 272 in a serving network (e.g. network 150) or home network (e.g. home network 190) for the UE. In some embodiments, one or more of the parameters in the request received at block 910 (e.g. a ProSe Application ID or a Restricted ProSe Application User ID) may have been received by the UE from a PSAP (e.g. PSAP 244/248). For example, PSAP provision of one or more of the parameters in the request received at block 910 may indicate prior verification of the emergency by the PSAP and/or may facilitate authorization of ES broadcast requests by the server.

In block 920, an authorization (e.g. a Discovery response) to broadcast ES Requests using the LTE Direct service may transmitted by the server (e.g. by ProSe function 270) to the UE (e.g. UE 120). In some embodiments, the authorization may include one or more parameters including: a ProSe Application Code, a ProSe Restricted Code, a validity timer, a Discovery Entry ID. The ProSe Application Code may correspond to a ProSe Application ID that was included in the request received at block 910 and may be included in the ES request later broadcast by the UE to identify the ES request or the type of ES request (e.g. a type of emergency situation or type of ES distress signal). The ProSe Restricted Code may be included as an alternative to a ProSe Application Code, may correspond to a Restricted ProSe Application User ID that was included in the request received at block 910, and may be included in the ES request later broadcast by the UE to identify, in a secure manner, the ES request or the type of ES request (e.g. a type of emergency situation or type of ES distress signal). The validity timer may indicate for how long a ProSe Application Code or a ProSe Restricted Code is valid. In some instances (e.g. where the requesting UE (e.g. UE 120) is not registered with and/or does not subscribe to a ProSe service), the authorization transmitted at block 920 may include additional configuration parameters for the LTE Direct broadcast (e.g. frequencies and/or channels to use for the broadcast, a power level for the broadcast and/or an interval of time for the broadcast). In some embodiments, the requesting UE may also receive some or all of the configuration parameters via broadcast from the serving network for the UE (e.g. network 150).

In some embodiments, the server may transmit the authorization at block 920 even when the UE is not subscribed to ProSe or not authorized to use ProSe in a serving network (e.g. network 150) based on an indication of a request for authorization received in block 910 to broadcast an ES request.

Figure 10:
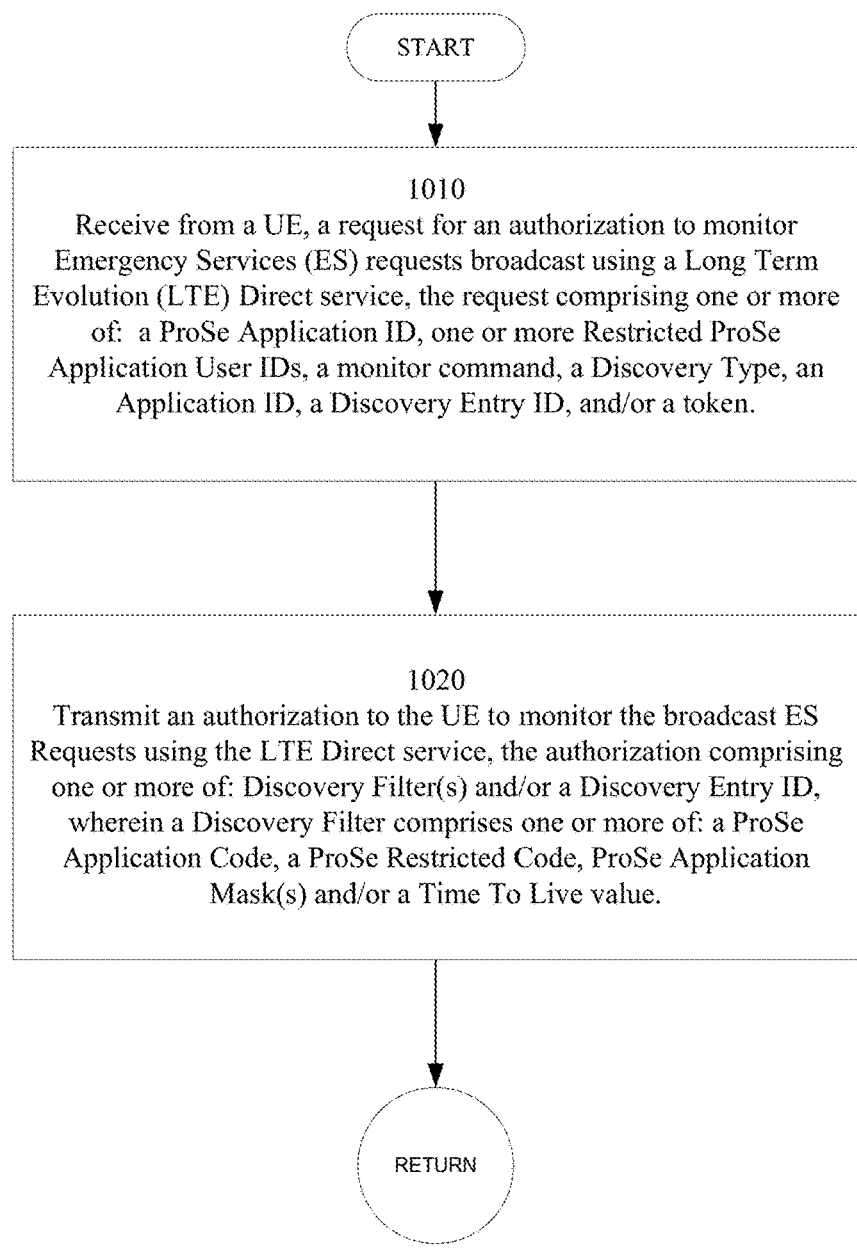
FIG. 10 shows another flowchart of an exemplary method for facilitating LTE Direct ES communication.

FIG. 10 shows an exemplary method 1000 for facilitating LTE Direct ES communication. In some embodiments, method 1000 may be performed by a server comprising one or more of ProSe Function 270, and/or a ProSe AS 272, and/or an ENS communicatively coupled to a UE (e.g. UE 125). The server (e.g. ProSe Function 270) may be associated with (e.g. may be part of) the serving network for UE 125 (e.g. serving network 150) or the home network for UE 125 (e.g. home network 190).

In some embodiments, in block 1010, a request (e.g. a Discovery Request) for authorization to monitor ES requests broadcast over a LTE Direct service may be received from a UE (e.g. UE 125). For example, the server (e.g. ProSe Function 270) may receive a request for an authorization to monitor ES requests broadcast over an LTE Direct service from UE 125. The request for authorization to monitor ES requests broadcast over a LTE Direct service may include one or more parameters including a ProSe Application ID, one or more Restricted ProSe Application User IDs, a monitor command, a Discovery Type, an Application ID, a Discovery Entry ID, and/or a token. The ProSe Application ID may indicate or identify the ES request or the type of ES request for which authorization for monitoring is requested by the UE (e.g. may indicate or identify a type of emergency situation or a type of ES distress signal). The Restricted ProSe Application User ID(s) may identify, in a secure manner, the user of the UE (e.g. UE 125) in association with an ES application for which monitoring is requested by the UE (e.g. UE 125), and may be included as an alternative to a ProSe Application ID. The Restricted ProSe Application User ID(s) may also identify, in a secure manner, the user(s) of one or more target UEs (e.g. UE 120) in association with an ES application, wherein a target UE (e.g. UE 120) broadcasts an ES request for which the UE (e.g. UE 125) is requesting authorization to monitor. The Discovery Type may, when included, indicate secure discovery, also referred to as restricted discovery. The Discovery Entry ID may indicate whether this is a new request. The Application ID may (i) indicate an application in the UE, wherein the application triggered or sent the request received at block 1010, and (ii) identify an emergency services related application. The token may comprise certain information included in the ES request for which authorization to monitor is requested at block 1010.

In some embodiments, one or more of the parameters in the request received at block 1010 may have been received by the UE from a ProSe AS 272 in a serving network (e.g. network 150) or home network (e.g. home network 190) for the UE. In some embodiments, one or more of the parameters in the request received at block 1010 (e.g. a ProSe Application ID, a Restricted ProSe Application User ID or a token) may have been received by the UE from a PSAP (e.g. PSAP 244/248). For example, a PSAP (e.g. PSAP 244/248) may provide a token comprising a ProSe Application ID or a Restricted ProSe Application User ID to the UE. The PSAP may later or previously provide the same token to a target UE (e.g. UE 120) to enable the target UE to obtain authorization to broadcast an ES request and/or to include in an ES request broadcast using LTE Direct. Provision of a common token by a PSAP to both the UE and a target UE may enable the UE to detect broadcast of an ES request by the target UE.

In block 1020, an authorization (e.g. comprising a Discovery Response) to monitor broadcasts of ES Requests using the LTE Direct service may be transmitted (e.g. by ProSe function 270) to the UE (e.g. UE 125). In some embodiments, the authorization may include one or more parameters including: Discovery Filter(s) and/or a Discovery Entry ID. A Discovery Filter may include a ProSe Application Code, a ProSe Restricted Code, ProSe Application Mask(s) and/or a Time To Live value. The ProSe Application Code may correspond to a ProSe Application ID that was included in the request received at block 1010 and may be used by the UE to monitor for, detect and recognize an ES request broadcast by some other UE (e.g. UE 120). The ProSe Restricted Code may be included as an alternative to a ProSe Application Code and may correspond to a Restricted ProSe Application User ID that was included in the request received at block 1010. The ProSe Restricted Code may be used by the UE to monitor for, detect and recognize, in a secure manner, an ES request broadcast by another UE (e.g. UE 120). The Time to Live parameter may indicate for how long a ProSe Discovery Filter parameter is valid.

Figure 11:
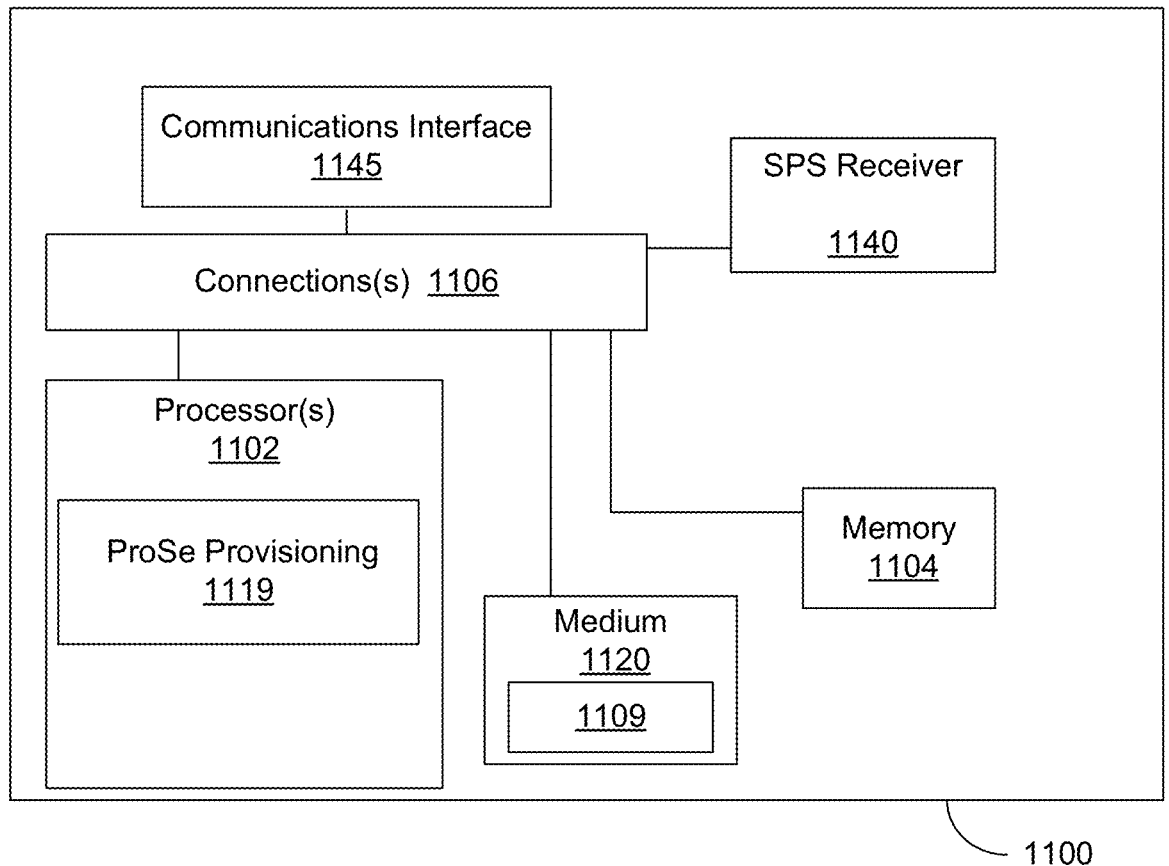
FIG. 11 shows a schematic block diagram illustrating certain exemplary features of a server enabled to support distress signaling according to techniques described herein.

FIG. 11 shows a schematic block diagram illustrating certain exemplary features of a server 1100 enabled to support distress signaling according to techniques described herein. In some embodiments, server 1100 may correspond to, or provide functionality associated with, ProSe function 270. In some embodiments, server 1110 may further provide functionality associated with ProSe AS 272, and/or an Expression Name Server (ENS). In some embodiments, server 1100 may perform methods 900 and/or 1000. In some embodiments, server 1100 may be configured to communicate with one or more of the entities shown in FIGS. 1, 2, 3, and 4 (as appropriate).

In some embodiments, server 1100 may, for example, include one or more processor(s) 1102, which may be operatively coupled with one or more connections 1106 (e.g., buses, lines, fibers, links, etc.) to non-transitory computer-readable medium 1120 and memory 1104. In certain example implementations, all or part of server 1100 may take the form of a chipset, a computer system and/or the like.

Processor(s) 1102 may be implemented using a combination of hardware, firmware, and software. In some embodiments, processor(s) 1102 may represent one or more circuits configurable to perform at least a portion of a computing procedure or process related to the operation of server 1100, ProSe function 270, ProSe AS 272 and/or an ENS. In some embodiments, processor(s) 1102 may include (e.g. may be configured to execute program instructions from memory 1104 and/or computer-readable medium 1120 to facilitate and/or provision LTE Direct ES or ProSe related communication (e.g. between UE 120 and UE 125).

In some embodiments, processor(s) 1102 may (e.g. may be configured to execute program instructions from memory 1104 for a ProSe Provisioning (PSP) component 1119, which may interact with entities shown in FIG. 1 to provision UEs (e.g. UE 120 and/or UE 125) for ProSe Discovery and/or ProSe Direct communication, including ES related communication as outlined herein.

In some embodiments, processor(s) 1102/PSP 1119 may configure or extend certain identifiers (IDs) and filters used for the 3GPP ProSe service to support the techniques described herein. For example, processor(s) 1102/PSP 1119 may: (i) assign and/or recognize a new value (or new values) for a ProSe Application ID (as defined in 3GPP TS 23.303) to identify an application associated with sending or receiving an ES Request (e.g. as in step 432); (ii) assign and/or recognize a value for a ProSe Application code (as defined in 3GPP TS 23.303) based on a new value for a ProSe Application ID in (i); (iii) assign and/or recognize a new value (or new values) for an Application Layer User ID (as defined in 3GPP TS 23.303) to identify a user in the context of sending an ES Request (e.g. as in step 432 in signaling flow 400); (iv) assign and/or recognize a value for a Restricted ProSe Application User ID (as defined in 3GPP TS 23.303) based on a new value for an Application Layer User ID in (iii); (v) assign and/or recognize a value for a ProSe Restricted Code (as defined in 3GPP TS 23.303) based on an assigned or recognized value for a Restricted ProSe Application User ID in (iv); and/or (vi) assign and/or recognize a value for a ProSe Application Mask based on an assigned or recognized value for a ProSe Application code in (ii) or a ProSe Restricted code in (v).

The methodologies described herein may be implemented by various means depending upon the application. For example, these methodologies may be implemented in hardware, firmware, software, or any combination thereof. For a hardware implementation, the processor(s) 1102 and/or PSP 1119 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies described herein may be implemented with microcode, procedures, functions, and so on that perform the functions described herein. Any machine-readable medium tangibly embodying instructions may be used in implementing the methodologies described herein. For example, software code may be stored in a non-transitory computer-readable medium 1120 or memory 1104 that is coupled to and executed by processor(s) 1102. Memory may be implemented within the processor(s) 1102 and/or may be external to the processor(s) 1102. As used herein the term "memory" refers to any type of long term, short term, volatile, non-volatile, or other memory and is not to be limited to any particular type of memory or number of memories, or type of media upon which memory is stored.

If implemented in firmware and/or software, the methodologies and functions described herein may also be stored as one or more instructions or program code 1109 on a non-transitory computer-readable medium, such as medium 1120 and/or memory 1104. Examples include computer-readable media encoded with a data structure and computer-readable media encoded with a computer program 1109. For example, the non-transitory computer-readable medium including program code 1109 stored thereon may include program code 1109 to support location determination, distress signaling, various communication protocols, including emergency communication (e.g. E911) related protocols.

Non-transitory computer-readable medium 1120 includes physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code 1109 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Memory 1104 may represent any data storage mechanism. Memory 1104 may include, for example, a primary memory and/or a secondary memory. Primary memory may include, for example, a random access memory, read only memory, etc. While illustrated in this example as being separate from processor(s) 1102, it should be understood that all or part of a primary memory may be provided within or otherwise co-located/coupled with processor(s) 1102. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 1120. As such, in certain example implementations, the methods and/or apparatuses presented herein may take the form in whole or part of a computer-readable medium 1120 that may include computer implementable instructions 1109 stored thereon, which if executed by at least one processor(s) 1102 may be operatively enabled to perform all or portions of the example operations as described herein. Computer readable medium 1120 may be a part of memory 1104.

Although the present disclosure is described in connection with specific embodiments for instructional purposes, the disclosure is not limited thereto. Various adaptations and modifications may be made to the disclosure without departing from the scope. Therefore, the spirit and scope of the appended claims should not be limited to the foregoing description.

What is claimed is:

1. A method of assisting an emergency situation at a first User Equipment (UE) comprising:
    initiating an emergency call with a Public Safety Answering Point (PSAP) using a network communication protocol, wherein initiating the emergency call with the PSAP comprises sending a first message to the PSAP requesting establishment of a communication session with the PSAP;
    receiving from the PSAP, a second message comprising a token; and
    transmitting to one or more second UEs an Emergency Services (ES) request comprising an indication of an emergency and first discovery information that is configured to assist in at least one of discovery and communication between the first UE and the one or more second UEs using a communication service based on a device-to-device protocol, wherein the first discovery information comprises at least part of the token, wherein the communication service is selected from a Long Term Evolution (LTE) Direct service, or a WiFi Direct service, wherein the one or more second UEs are distinct from the first UE.

2. The method of claim 1, further comprising:
    receiving a response to the ES request from the one or more second UEs, the response comprising second discovery information.

3. The method of claim 2, wherein the response to the ES request is received using the communication service, the method further comprising:
    establishing, based on at least one of the first discovery information and the second discovery information, a first secure communication session between the first UE and the one or more second UEs using the communication service.

4. The method of claim 2, further comprising:
    receiving, at the first UE, location information indicative of a location of the first UE from a particular second UE of the one or more second UEs.

5. The method of claim 4, wherein the location information indicative of the location of the first UE comprises information indicative of a range between the first UE and the particular second UE, or information indicative of a measurement of an angle of arrival of a signal from the first UE at the particular second UE, or both.

6. The method of claim 2, further comprising:
receiving, at the first UE, location information indicative of a location of a particular second UE of the one or more second UEs.

7. The method of claim 1, wherein the communication service is the LTE-Direct service and wherein transmitting the ES request using the device-to-device communication service comprises transmitting an LTE Direct private expression or a Proximity-based Services (ProSe) Restricted Code indicative of the ES request.

8. The method of claim 1, further comprising:
determining that communication was not successfully established in response to initiating the emergency call, and wherein transmitting the ES request using the device-to-device communication service comprises broadcasting an LTE Direct public expression or a Proximity-based Services (ProSe) Application Code indicative of the ES request.

9. The method of claim 1, further comprising:
establishing the communication session with the PSAP.

10. The method of claim 1, wherein the first message and the second message are messages for a Session Initiation Protocol (SIP), wherein,
the first message is a SIP INVITE message, and
the second message is a SIP INFO message, a SIP UPDATE message, or a SIP 200 OK message.

11. The method of claim 1, wherein initiating the emergency call comprises initiating the emergency call in response to user input, sensor information, or a combination, and wherein the ES request further comprises an emergency indication.

12. A first UE comprising:
a memory;
a transceiver; and
a processor coupled to the memory and the transceiver, wherein the processor is configured to:
initiate, using the transceiver, an emergency call with a Public Safety Answering Point (PSAP) using a network communication protocol, wherein to initiate the emergency call with the PSAP, the processor is configured to send, using the transceiver, a first message to the PSAP requesting establishment of a communication session with the PSAP;
receive from the PSAP, a second message comprising a token; and
transmit to one or more second UEs, using the transceiver, an Emergency Services (ES) request comprising an indication of an emergency and first discovery information that is configured to assist in at least one of discovery and communication between the first UE and the one or more second UEs using a communication service based on a device-to-device protocol, wherein the first discovery information comprises at least part of the token, wherein the communication service is selected from a Long Term Evolution (LTE) Direct service, or a WiFi Direct service, wherein the one or more second UEs are distinct from the first UE.

13. The first UE of claim 12, wherein the processor is further configured to:
receive a response to the ES request from the one or more second UEs, the response comprising second discovery information.

14. The first UE of claim 13, wherein the response to the ES request is received using the communication service, and the processor is further configured to:
establish, based on at least one of the first discovery information and the second discovery information, a first secure communication session between the first UE and the one or more second UEs using the communication service.

15. The first UE of claim 13, wherein the processor is further configured to:
receive, at the first UE, location information indicative of a location of the first UE from a particular second UE of the one or more second UEs.

16. The first UE of claim 15, wherein the location information indicative of the location of the first UE comprises information indicative of a range between the first UE and the particular second UE, or information indicative of a measurement of an angle of arrival of a signal from the first UE at the particular second UE, or both.

17. The first UE of claim 13, wherein the processor is further configured to:
receive, at the first UE, location information indicative of a location of a particular second UE of the one or more second UEs.

18. The first UE of claim 12, wherein the communication service is the LTE-Direct service and wherein to transmit the ES request using the device-to-device communication service, the processor is configured to:
transmit an LTE Direct private expression or a Proximity-based Services (ProSe) Restricted Code indicative of the ES request.

19. The first UE of claim 12, wherein the processor is configured to:
determine that communication was not successfully established in response to initiating the emergency call, and wherein transmitting the ES request using the device-to-device communication service comprises broadcasting an LTE Direct public expression or a Proximity-based Services (ProSe) Application Code indicative of the ES request.

20. The first UE of claim 12, wherein the processor is configured to:
establish the communication session with the PSAP.

21. The first UE of claim 12, wherein the first message and the second message are messages for a Session Initiation Protocol (SIP), wherein,
the first message is a SIP INVITE message, and
the second message is a SIP INFO message, a SIP UPDATE message, or a SIP 200 OK message.

22. The first UE of claim 12, wherein the processor is configured to initiate the emergency call in response to user input, sensor information, or a combination, and wherein the ES request further comprises an emergency indication.

23. A first UE comprising:
means for initiating an emergency call with a Public Safety Answering Point (PSAP) using a network communication protocol wherein means for initiating comprises means for sending a first message to the PSAP requesting establishment of a communication session with the PSAP;
means for receiving from the PSAP, a second message comprising a token; and
means for transmitting to one or more second UEs an Emergency Services (ES) request comprising an indication of an emergency and first discovery information that is configured to assist in at least one of discovery and communication between the first UE and the one or more second UEs using a communication service based on a device-to-device protocol, wherein the first discovery information comprises at least part of the token, wherein the communication service is selected from a Long Term Evolution (LTE) Direct service, or a WiFi Direct service, wherein the one or more second UEs are distinct from the first UE.

24. The first UE of claim 23, further comprising:
means for receiving a response to the ES request from the one or more second UEs, the response comprising second discovery information.

25. The first UE of claim 24, wherein the response to the ES request is received using the communication service, further comprising:
means for establishing, based on at least one of the first discovery information and the second discovery information, a first secure communication session between the first UE and the one or more second UEs using the communication service.

26. A non-transitory computer-readable medium comprising executable instructions to configure a processor to:
initiate an emergency call with a Public Safety Answering Point (PSAP) using a network communication protocol by sending a first message to the PSAP requesting establishment of a communication session with the PSAP;
receive from the PSAP, a second message comprising a token; and
transmit to one or more second UEs an Emergency Services (ES) request comprising an indication of an emergency and first discovery information that is configured to assist in at least one of discovery and communication between the first UE and the one or more second UEs using a communication service based on a device-to-device protocol, wherein the first discovery information comprises at least part of the token, wherein the communication service is selected from a Long Term Evolution (LTE) Direct service, or a WiFi Direct service, wherein the one or more second UEs are distinct from the first UE.

27. The computer-readable medium of claim 26, further comprising executable instructions to configure the processor to:
receive a response to the ES request from the one or more second UEs, the response comprising second discovery information, wherein the one or more second UEs are distinct from the first UE.

28. The computer-readable medium of claim 27, wherein the executable instruction configure the processor to receive response to the ES request is received using the communication service, and further comprising executable instructions to configure the processor to:
establish, based on at least one of the first discovery information and the second discovery information, a first secure communication session between the first UE and the one or more second UEs using the communication service.

* * * * *